United States Patent
Strongin et al.

(10) Patent No.: US 7,127,573 B1
(45) Date of Patent: Oct. 24, 2006

(54) MEMORY CONTROLLER PROVIDING MULTIPLE POWER MODES FOR ACCESSING MEMORY DEVICES BY REORDERING MEMORY TRANSACTIONS

(75) Inventors: Geoffrey S. S. Strongin, Austin, TX (US); Brian D. McMinn, Buda, TX (US); Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/564,765

(22) Filed: May 4, 2000

(51) Int. Cl.
*G06F 12/06* (2006.01)
(52) U.S. Cl. ............... 711/158; 711/151; 713/1
(58) Field of Classification Search ........... 711/150, 711/151, 154, 156, 157, 158, 169, 213, 67, 711/105, 167, 166; 713/320, 323, 100; 710/6
See application file for complete search history.

(56) References Cited

U.S. PATENT DOCUMENTS

| | | | | |
|---|---|---|---|---|
| 5,638,534 A | * | 6/1997 | Mote, Jr. ............. | 711/105 |
| 5,715,421 A | * | 2/1998 | Akiyama et al. ......... | 365/203 |
| 5,745,913 A | | 4/1998 | Pattin et al. | |
| 5,761,452 A | | 6/1998 | Hooks et al. | |
| 5,860,106 A | * | 1/1999 | Domen et al. ............. | 365/227 |
| 5,907,860 A | | 5/1999 | Garibay, Jr. et al. | |
| 5,926,831 A | | 7/1999 | Revilla et al. | |
| 5,999,876 A | * | 12/1999 | Irons et al. ............... | 701/115 |
| 6,112,265 A | * | 8/2000 | Harriman et al. ............ | 710/39 |
| 6,199,138 B1 | | 3/2001 | Jeddeloh | |
| 6,199,145 B1 | | 3/2001 | Ajanovic et al. | |
| 6,219,769 B1 | | 4/2001 | Strongin et al. | |
| 6,226,721 B1 | | 5/2001 | Strongin et al. | |
| 6,260,123 B1 | | 7/2001 | Strongin et al. | |
| 6,263,409 B1 | | 7/2001 | Haupt et al. | |
| 6,295,553 B1 | | 9/2001 | Gilbertson et al. | |
| 6,334,159 B1 | | 12/2001 | Haupt | |
| 6,381,672 B1 | | 4/2002 | Strongin et al. | |
| 6,381,683 B1 | | 4/2002 | Strongin et al. | |
| 6,496,905 B1 | * | 12/2002 | Yoshioka et al. ........... | 711/154 |
| 6,510,497 B1 | | 1/2003 | Strongin et al. | |
| 6,546,439 B1 | * | 4/2003 | Strongin et al. ............. | 710/52 |
| 6,564,284 B1 | | 5/2003 | Christenson | |
| 6,680,878 B1 | * | 1/2004 | Minabe et al. ........... | 369/24.01 |

OTHER PUBLICATIONS

V. Tiwari and M. T-C. Lee, "Power Analysis of a 32-bit Embedded Microcontroller", In Proc. The Asia and South Pacific Design Automation Conference, pp. 4 and 16. 1995.*
Su, Ching-Long and Tsui, Chi-Ying and Despain, Alvin M., "Low Power Architecture Design and Compilation Techniques For High-Performance Processors", Sections 1.2 and 4-5, Feb. 1994.*

(Continued)

*Primary Examiner*—Pierre-Michel Bataille
(74) *Attorney, Agent, or Firm*—Zagorin O'Brien Graham LLP

(57) ABSTRACT

A memory controller includes a power mode sensitive reordering device coupled to receive a power mode indication. The memory controller includes a selectable high and low power mode. An indication of which of the high and low power modes is selected is coupled to the power mode sensitive reordering device as the power mode indication. In the low power mode, memory transactions are reordered to minimize power consumption in memory devices controlled by the memory controller.

18 Claims, 18 Drawing Sheets

OTHER PUBLICATIONS

IBM Technical Disclosure Bulletin, vol. 38, No. 9, Sep. 1995 Method for Maintaining Coherency When Entering and Exiting Low-Power Mode in a Memory Controller Supporting Transaction Posting.*
Micron Technology, Inc., "Double Data Rate SDRAM", 1999, pp. 1-53.
Micron Technology, Inc., "Rambus™ DRAM", 1999, pp. 1-4.
Micron Technology, Inc., "Rambus® RIMM™", 1999, pp. 1-6.
Micron Technology, Inc., "Synchronous DRAM", 1999, pp. 1-53.
Rambus, Inc., "Rambus® Technology Overview", Feb. 1999, pp. 1-10.
Rambus, Inc., Direct Rambus™ System and Board Design Considerations, May 1998, pp. 1-3.
Micron Technology, Inc., "SDRAM Write to Active Command Timing", 1998, pp. 1-4.

U.S. Appl. No. 09/208,569, filed Dec. 9, 1998, entitled "Method and Systems for Generating and Utilizing Speculative Memory Access Requests in Data Processing Systems", by Geoffrey S. S. Strongin and Qadeer A. Qureshi.
U.S. Appl. No. 09/207,971, filed Dec. 9, 1998, entitled "Method and System for Page-State Sensitive Memory Control and Access in Data Processing Systems", by Geoffrey S. S. Strongin and Qadeer Ahmad Qureshi.
Dennis Lee and Jean-Loup Baer, "Instruction Cache Fetch Policies for Speculative Execution," 1995 ACM 0-89791-698-0/95/0006 . . . , pp. 357-367.
Anne Rogers and Kai Li, "Software Support for Speculative Loads," 1992 ACM 0-89791-535-6/0010/0038 . . . , pp. 38-50.

* cited by examiner

KEY TO FIG. 4

MEMORY CONTROLLER PROVIDING MULTIPLE POWER MODES FOR ACCESSING MEMORY DEVICES BY REORDERING MEMORY TRANSACTIONS

BACKGROUND OF THE INVENTION

1. Cross-Reference to Related Applications

The present invention is related to subject matter disclosed in, U.S. patent application entitled, "Method And System For Generating and Utilizing Speculative Memory Access Requests in Data Processing Systems", application Ser. No. 09/208,569, naming Geoffrey S. S. Strongin and Qadeer A. Qureshi as inventors and filed Dec. 9, 1998; and to U.S. patent application entitled, "Method and Apparatus for Page-State Sensitive Memory Control and Access in Data Processing Systems", application Ser. No. 09/207,971, naming Geoffrey S. S. Strongin and Qadeer A. Qureshi as inventors and filed Dec. 9, 1998, which applications are incorporated herein by reference.

2. Field of the Invention

The present invention relates generally to computer systems and more particularly to memory control functions within computer systems.

3. Description of the Related Art

In conventional computer systems, such as personal computer systems utilizing x86 based processors, the processor, along with other components in the computer system, are coupled to main system memory through an integrated circuit known in the art as the "North Bridge." The North Bridge provides a memory control function as well as a bridge function between the host bus connected the processor and system input/output buses such as the Peripheral Component Interconnect (PCI) bus and the devices connected to the PCI bus.

In current architectures, the PCI bus provides the major I/O bus for the computer system. Other buses are commonly found in conventional computer systems. One such bus is the Universal Serial Bus (USB) bus and another bus is the IEEE 1394 bus. USB and 1394 traffic typically communicate with system memory through a South Bridge integrated circuit, which is coupled to the PCI bus. The South Bridge provides a bridge function between the PCI bus and other buses. In addition, the South Bridge provides for such functions as communication with a variety of legacy devices and provides power management functions. In any case, the buses at issue, and the devices which couple to those buses access system memory through the PCI bus.

One exception is a graphics bus, the Accelerated Graphics Port (AGP), which has been developed to both (1) reduce the load on the PCI bus systems, and (2) extend the graphics capabilities of systems. The AGP interface standard (defined by *Accelerated Graphics Port Interface Specification*, Revision 1.0 (31 Jul. 1996) from Intel corporation), allows the graphics processor to retrieve graphics information from system memory independently of the PCI.

In current industry architectures, the host bus, the AGP interconnect, and the PCI bus access system memory through the memory controller in the North Bridge. The memory controller maps logical addresses used by the processor to physical locations in system memory. The system memory controlled by the North Bridge is typically made up of a plurality of Direct Random Access Memory chips (DRAMs). There are a number of different types of DRAMs that may be used in system memory in current and future memory systems, such as RDRAM (Rambus DRAM), SDRAM (Synchronous DRAM), DDRSDRAM (Double data rate SDRAM).

DRAMs are organized into various banks. Each bank is comprised of a matrix of storage locations organized in rows and columns. When a memory access occurs, such as a read cycle, the memory controller receives an address over one of the buses, maps the received address into an appropriate physical address and performs the access operation to system memory. Consequently, an address, which for sake of illustration will be assumed to be 16 bits long, customarily is conceived of as being composed of two parts: a first 8-bit portion of the address which is associated with a row address, and a second 8-bit portion which is associated with a column address (the bit lengths are exemplary and merely utilized here for illustrative purposes). This separation of the address into row and column portions allows the address to correctly specify a storage location, or cell, by its row and column.

In order to minimize the number of pins on the DRAM, memory accesses in conventional DRAMs typically place the row portion of the address on the address bus to select the appropriate row, and then place the column portion of the address on the address bus to select the appropriate column. At some time after the row and column information have both been specified, the data from the memory location specified by the row and column address appears on the DRAM data bus.

From the foregoing, it can be seen that in order to make a single memory access there are three phases: a row address phase, a column address phase, and a data retrieval phase. In the past, it was noticed that typical programs tend to operate sequentially, so if there is a memory address accessed, it is likely that the next memory address accessed will be the very next cell, which means that the column address is likely to change, while the row address is not likely to change. Consequently, typical DRAMs are structured such that once the row address has been provided, thereafter DRAMS can continue to access the row (also referred to herein as page) that is "open" in the DRAM.

In the event that a memory controller has several memory accesses to be done sequentially, then once a page is open it would be desirable from an efficiency standpoint to examine pending as well as current memory accesses in order to determine which of those pending memory accesses will be to memory locations that are within a currently open page (that is, the row of the request is the row from which a memory controller is currently reading within a DRAM). In other words, assuming a page X is open, if there are four memory accesses A, B, C, and D, waiting to be performed, and assuming the first access A is to page Z, the second access B is to page X, the third access C is to page Y, and the fourth access D is to page W, it is preferable from a memory efficiency standpoint that the data access (i.e., access B) to the page that is open (i.e., page X) be made first.

Current memory controllers do not typically "look ahead" to see if certain pending memory accesses are destined for currently open pages based on the type of stream that is currently accessing memory. Furthermore, at any given time, typically more than one page of memory is generally open and in future systems this will become more likely. For example, under the Direct RDRAM scheme, it is expected that up to 8 pages per RDRAM chip will be open simultaneously. Thus, if a system has eight RDRAM chips (a reasonable assumption), it will be possible to have up to 64 pages open simultaneously.

Controlling memory access via the use of "look ahead" would be undeniably valuable. Furthermore, as the foregoing has shown, the prospective ability of the memory controllers to schedule memory access on the basis of look ahead is likely to become even more important in that future system memories are likely to be able to provide a very large number of open pages of memory simultaneously. It is therefore apparent that a need exists in the art for a method and system which will provide data processing systems, having memory controllers, with the ability to look ahead and intelligently schedule accesses to system memory utilizing information gained from such looking ahead.

In addition to the foregoing, another problem of concern to memory designers and memory controller designers is the issue of power consumption by the memory devices. Advanced DRAMs achieve higher performance but pay a penalty in higher power consumption. The more pages that are open, the more power is consumed. To address power concerns, some DRAMs provide reduced power modes in which some or all of a given memory component can be placed in a reduced power mode. However, such reduced power modes are provided at the cost of significantly increased latency. It would be desirable to be able to control memory to reduce power consumption without an associated large increase in latency by intelligently using the information available about current and pending transactions.

SUMMARY OF THE INVENTION

Accordingly, in one embodiment the invention provides a memory controller for controlling memory devices comprising a power mode sensitive reordering device coupled to receive a power mode indication. The memory controller includes a selectable high and low power mode. An indication of which of the high and low power modes is selected is coupled to the power mode sensitive reordering device as the power mode indication. In the low power mode, memory transactions are reordered to minimize power consumption in memory devices controlled by the memory controller.

Various approaches may be used by the power mode sensitive reordering device to reduce power consumption in the low power mode. The power mode sensitive reordering device may reorder memory transactions to a first page in memory from an original order to a new order in which transactions to the first page are grouped together, to minimize the length of time that the first page remains in an open state. The power mode sensitive reordering device may reorder memory transactions to an open page from an original order to a new order which schedules together transactions to the open page before transactions to a closed page. The power mode sensitive reordering device may reorder a memory access request to an open page from an original order to schedule together memory requests to the open page ahead of memory requests to a closed page. The power mode sensitive reordering device may, when a target page for a streaming transaction is closed, hold a memory request for the target page in the memory controller until a predetermined number of memory requests for the target page have accumulated. In a high power mode, memory transactions are reordered to minimize latency.

In another embodiment, the invention provides a method of operating a memory controller. The method includes the memory controller reordering a plurality of memory access requests according to a selected power mode in a power mode sensitive reordering device. The method further includes selecting as the selected power mode one of a high and low power modes and providing an indication of the selected mode to the power mode sensitive reordering device.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

I. Environment for Methods and Systems

Figure 1:
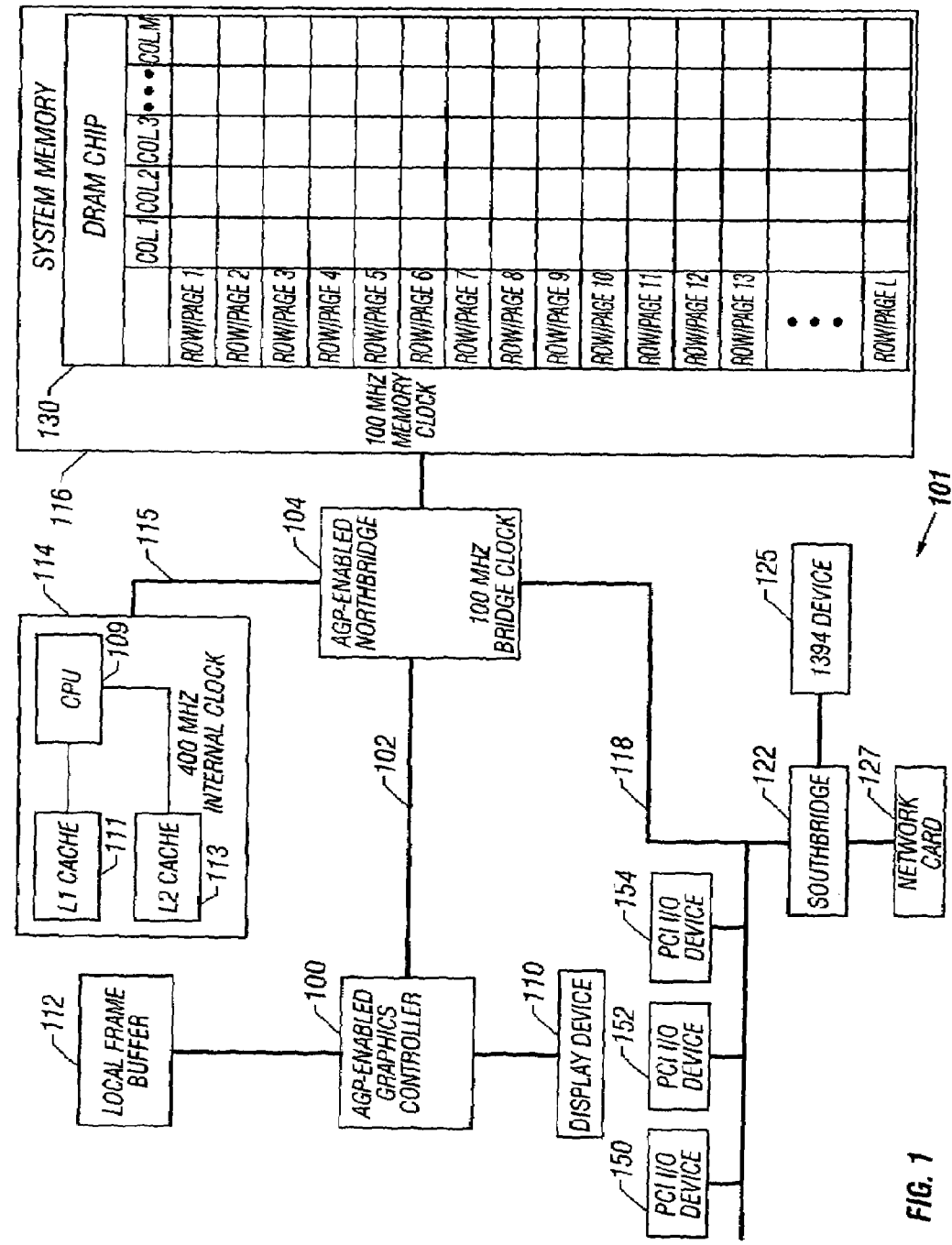
FIG. 1 shows a high-level component diagram depicting data processing system which forms an environment wherein one or more embodiments of the present invention may be practiced.

Referring now to FIG. 1, a high-level component diagram depicts an exemplary data processing system 101 providing an environment in which one or more embodiments of the present invention may be practiced. Data processing system 101 includes graphics controller 100, AGP interconnect 102 (a data bus), and Northbridge 104. The computer system further includes display device 110, local frame buffer 112, microprocessor 114 (which includes central processing Unit (CPU) 109, L1 Cache 111, and L2 Cache 113), CPU host bus 115, system memory 116, Peripheral Component Interconnect (PCI) bus 118, various PCI Input-Output (I/O) devices 150, 152, and 154, Southbridge 122, network card 127, and 1394 device 125.

Note that microprocessor 114 is exemplary of any general processing unit, including but not limited to multiprocessor units; CPU bus 115 (also referred to as a host bus or front side bus) is exemplary of any processor bus, including but not limited to multiprocessor buses; PCI bus 118 is exemplary of any input/output (I/O) bus; PCI devices 150–154 are exemplary of any input-output devices attached to an I/O bus; AGP Interconnect 102 is exemplary of any graphics bus; graphics controller 100 is exemplary of any graphics controller; Northbridge 104 and Southbridge 122 are exemplary of any type of bridge; 1394 device 125 is utilized as exemplary of any type of isochronous source; and network card 127, even though the term "network" is used, is intended to serve as exemplary of any type of synchronous or asynchronous input-output cards. Consequently, as used herein these specific examples are intended to be representative of their more general classes.

Generally, each bus utilizes an independent set of protocols (or rules) to conduct data (e.g., the PCI local bus specification and the AGP interface specification). Those protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. That translation mechanism is normally contained in a hardware device in the form of a bus-to-bus bridge (or interface) through which the two different types of buses are connected. This is one of the functions of Northbridge 104, in that it is to be understood that it translates and coordinates between the various data buses which communicate through Northbridge 104.

Notwithstanding the issue of differing bus protocols, further illustrated in FIG. 1 is that various system components operate off of various internal clocks, where each internal clock can vary from others present. Regarding the non-limiting exemplary clock speeds shown, it will be understood by those within the art that, typically, processor 114 multiplies a bus clock (an external clock, not shown) in order to generate an internal clock that is faster (e.g., twice, three time, four times, etc.) than the bus clock. In contrast, Northbridge 104 and system memory 116 typically use the bus clock as their respective internal clocks without multiplying the bus clock. Specifically, shown is that processor 114 operates off an internal clock whose speed is illustrated at 400 MHz, Northbridge 104 operates off an internal bridge clock whose speed is illustrated at 100 MHz, and system memory 116 operates off an internal memory clock whose speed is illustrated at 100 MHz. Those skilled in the art will recognize that those clock speeds are non-limiting, exemplary only and can vary widely, and that each described component can have a clock speed varying from each of the other described components.

Those skilled in the art will recognize that CPU 109 sends a request to memory only when the data it is seeking to access is not resident in either L1 cache 111 or L2 cache 113. That is, CPU 109 only seeks to read from system memory 116 when a miss occurs with respect to L1 cache 111 or L2 cache 113. One problem that arises when CPU 109 must access system memory 116 is that while the CPU is running at an internal speed of 400 MHz, Northbridge 104 and system memory 116 are only running at 100 MHz, so when CPU 109 has to access system memory 116, the internal clock speeds of Northbridge 109 and system memory 116 become the factors ultimately controlling the speed of system memory 116 access. Thus, when CPU 109 has to go outside processor 114 to access data, the speed of access becomes controlled by the 100 MHz bridge and memory clocks. Those skilled in the art will recognize that typically Northbridge 104 may require up to two bridge clock cycles to determine what to do with a specific memory request from processor 109. Notice that in the example shown that translates into 8 CPU 109 internal clock cycles in that the CPU internal clock is running 4 times faster than the bridge clock.

Once Northbridge 104 has determined that it has received a request from CPU 109 to access system memory 116, Northbridge 104 thereafter sends the request to system memory 116. Upon receipt of the request, system memory 116 has to drive the address on a DRAM chip 130 address bus, and DRAM chip 130 has to decode the address, access the location, and drive the data back to Northbridge 104 which thereafter drives the data back to processor 114. Those skilled in the art will recognize that the foregoing operations generally require anywhere from 5 to 15 bridge/memory clock cycles (bridge and memory clocks are shown as running at the same speed in FIG. 1, but those skilled in the art will recognize that this is not necessarily the case) between CPU 109 requesting data from system memory 116, and CPU 109 receiving the data in response to its request. The foregoing noted clock cycles translate into a very substantial latency from the standpoint of processor 114 (e.g., 20–60 processor 114 internal clock cycles). Consequently, processor 114 can spend a significant amount of time waiting for system memory 116 to respond to a request for data. Furthermore, it is significant that the foregoing described example was based on an assumption that DRAM 130 in system memory 116 was in a state in which it could service a request, and those skilled in the art will recognize that if DRAM 130 had not been in a state wherein it could service a request (e.g., a page in DRAM 130 had been closed or had been in a transitional "refresh" state), the foregoing described latency could have been much greater than that illustrated.

Those skilled in the art will recognize that another problem, in addition to the foregoing described problem of latency, is that typically a memory request on CPU bus 115 tends to function as a blocking cycle, so data processing system 101 tends to come to a halt while CPU 109 is waiting to access system memory 116. Thus, the foregoing has demonstrated via non-exclusive examples that main memory latency is one of the most significant issues limiting the performance of current data processing systems.

In addition to the foregoing, newer systems have AGP subsystems which can put a significant amount of extra loading on system memory 116. Under the current specification, AGP-based devices can put up to 1 Gbyte per second of load on system memory 116. Thus, in systems where AGP-devices are present (such as data processing system 101), when a memory controller (not shown) is servicing AGP requests, it is apparent that the foregoing described latencies will tend to go even higher. In addition, PCI bus 118 also adds yet more loading onto system memory 116. Thus, in the presence of AGP devices and PCI devices, system memory 116 latency becomes even more of an issue than that previously described, which as can be seen was actually effectively a "best case" (or least latency) scenario.

It has been discovered that significant reductions in main memory latency can be achieved by taking advantage of correlations internal to multiple independent streams of memory accesses. As used herein, the term "correlation" means that different addresses corresponding to different accesses tend to fall within a relatively narrow range. For non-limiting example, when graphics controller 100 accesses system memory 116, such accessing tends to be highly correlated in that the memory locations accessed tend to be in closely situated addresses.

Figure 2:
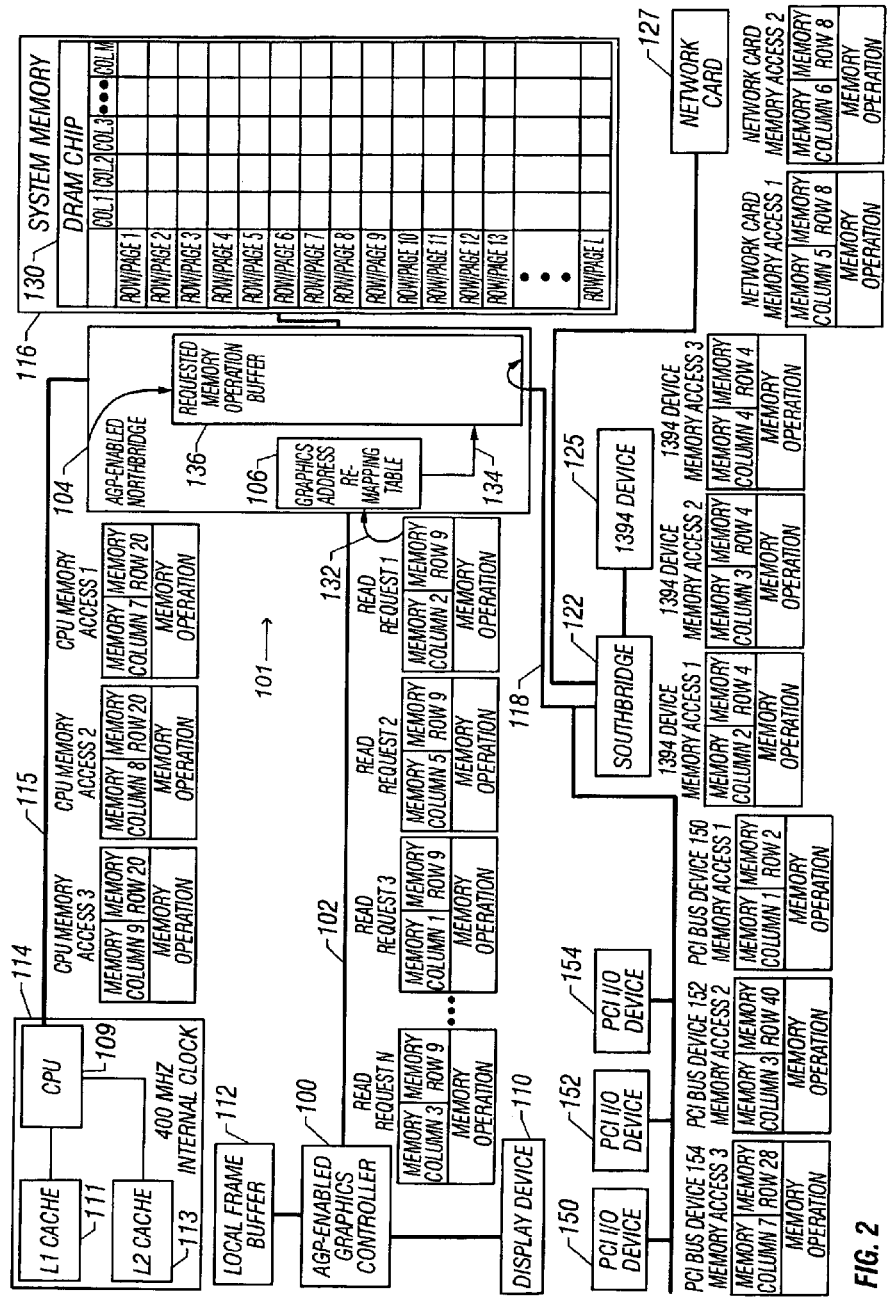
FIG. 2 depicts a high-level block diagram illustrating in broad overview how data requests may arise within the system of FIG. 1.

Referring now to FIG. 2, the high-level block diagram illustrates in broad overview how data requests may arise within system 101 of FIG. 1, which forms an environment wherein one or more embodiments of the present invention may be practiced. For illustrative purposes, each of the accesses in FIG. 2 are shown referencing a particular row and column location in DRAM chip 130. Those skilled in the art will understand that each memory request is for an address, which is translated appropriately by Northbridge 104 to a row and column of a particular memory device. The components shown function similarly to the like-numbered components described in relation to FIG. 1.

Under the AGP interface standard a graphics controller can issue pipelined requests for data. As illustrated in FIG. 2, the graphics controller issues N (where N is some positive integer) read requests to read data from a particular cell, or row and column location, from DRAM chip 130 in system memory 116 prior to any of the N−1 outstanding read requests being answered. It should be noted that although for conceptual clarity the read requests are shown in FIG. 1 as requests 1 through N, under the AGP standard there is no such labeling, and under the AGP standard such ordering is merely denoted by transmission order of the requests. Further illustrated is that within DRAM chip 130 each row can be conceptualized as a "page" in memory.

Those skilled in the art will recognize that the AGP interface standard allows devices to treat AGP memory as if it were one contiguous whole, while it may actually be several discontiguous regions of system memory. Accordingly, under the AGP-interface standard read requests to system memory first transit 132, 134 Graphics Address Re-mapping Table (GART) 106 prior to being loaded into requested memory operation buffer 136. Ordinarily, GART 106 re-maps the row and column AGP-memory addresses for which accesses are requested into row and column physical memory addresses. However, for sake of clarity of presentation and understanding, herein GART 106 will be treated as if it is transparent to the process. That is, while those skilled in the art will recognize that GART 106 will typically re-map requested addresses, in the present detailed description GART 106 will be treated as if it merely passes the addresses through without re-mapping them so that the embodiments discussed herein can be more clearly understood.

In addition, it should be recognized that the memory controller typically maintains tables which map logical addresses utilized by the processor into physical addresses in system memory. Thus for example, a page in the processor may comprise 4K contiguous bytes in logical as well as physical memory. However, the next page, i.e., the next 4K of logical addresses may reside in a completely unrelated physical location.

Under some host bus protocols, processor 114 can issue pipelined memory accesses. In FIG. 2 processor 114 issues 3 pipelined memory accesses, each of which is to a particular cell, or row and column location, within DRAM chip 130 in system memory 116. For conceptual clarity, the read requests are shown in FIG. 1 as labeled requests 1 through 3. Under the CPU bus standards, there may be no such labeling.

Three PCI bus devices 150–154 are shown to have placed 3 separate memory access requests on PCI bus 118. It will be understood by those within the art that ordinarily only one such PCI bus device memory access may be resident on PCI bus 118 at any particular time. Consequently, it will be understood by those within the art that the depicted 3 PCI bus 118 memory access requests are illustrative of the three requests occurring at three distinct different instances in time.

Historically, any PCI bus device requesting memory access via PCI bus 118 had to wait for the requested memory access to be completed prior to relinquishing PCI bus 118. That was found to result in inefficiency due to PCI bus 118 being monopolized by any such PCI bus device waiting for an access to complete. It has been found that a way around the monopolization problem is to terminate each PCI request to access memory without waiting for the data to be manipulated by the request to travel all the way from/to memory (i.e., without waiting for the cycle to complete). For example, it is conceivable to have multiple PCI requests outstanding within Northbridge 104 by mandating that Northbridge 104, in response to a request for memory access from PCI bus device 150–154, direct the PCI master to retry, which will result in the PCI master releasing the bus thus freeing PCI bus 118 so that other PCI masters can issue requests. Any subsequently retried accesses will often be completed quickly because Northbridge 104 will typically have the data ready when the request is retried. Thus, the foregoing schemes demonstrate that there could be multiple memory transactions pending within Northbridge 104 from various PCI devices at any given time, even though PCI bus 118 can ostensibly support only one transaction at a given time.

Likewise with the five remaining accesses depicted. Although FIG. 2 depicts three 1394 device 125 memory access requests, those within the art understand that ordinarily only one such memory access may be resident on PCI bus 118 at any particular time. In like fashion, although FIG. 2 depicts two network cards 127 memory access requests those within the art would understand that ordinarily only one such memory access may be resident on PCI bus 118 at any particular time. Consequently, it will be understood by those within the art that the depicted five remaining memory access requests are illustrative of the five requests occurring at five distinct instances in time. FIG. 2 also shows that 1394 device 125 requests and network card 127 requests travel to and from Northbridge 104 through Southbridge 122 in conjunction with PCI bus 118.

Figure 3:
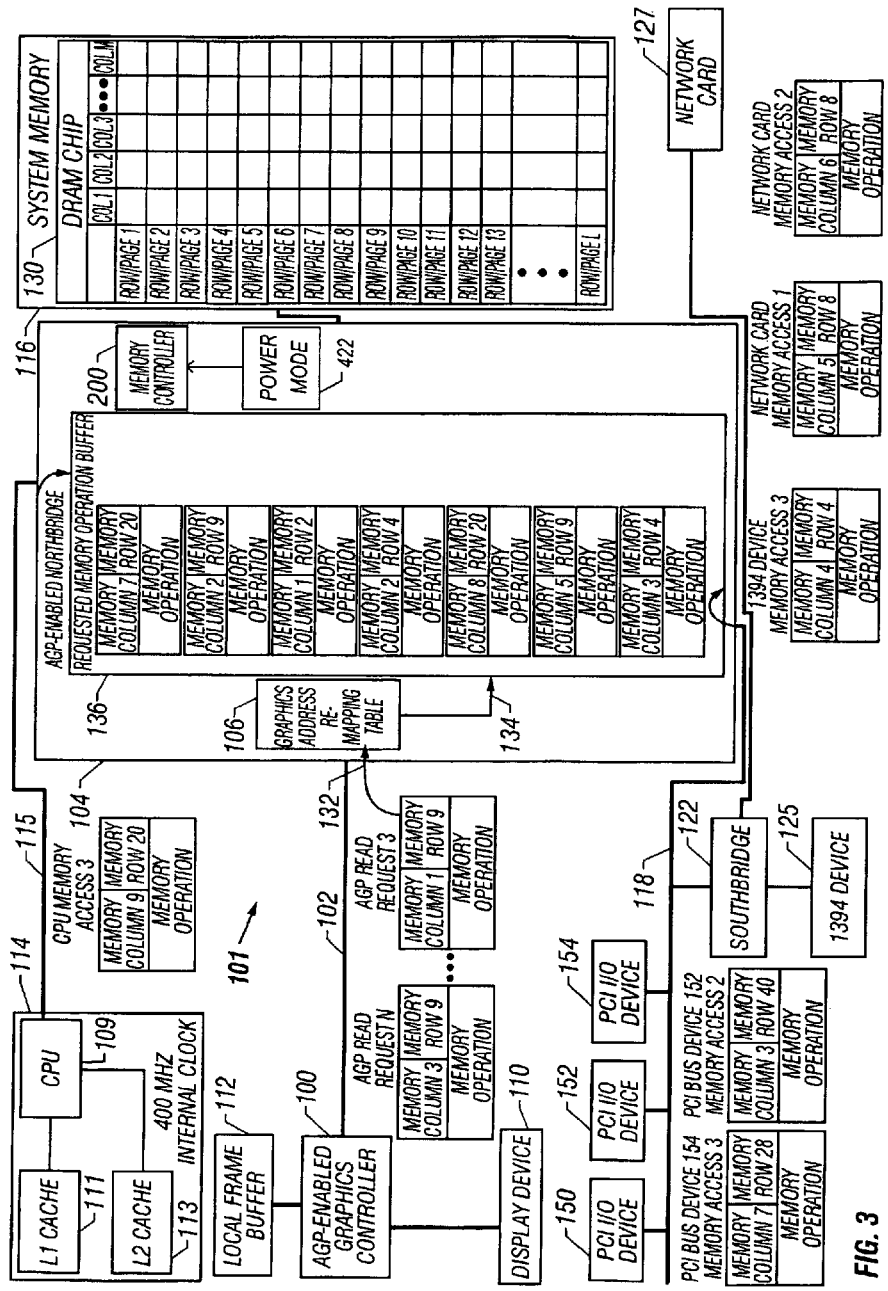
FIG. 3 illustrates a high-level block diagram showing in broad overview how the system of FIG. 1 accesses memory and manipulates data within the memory locations specified by the memory access requests illustrated in FIG. 2.
Figure 4A:
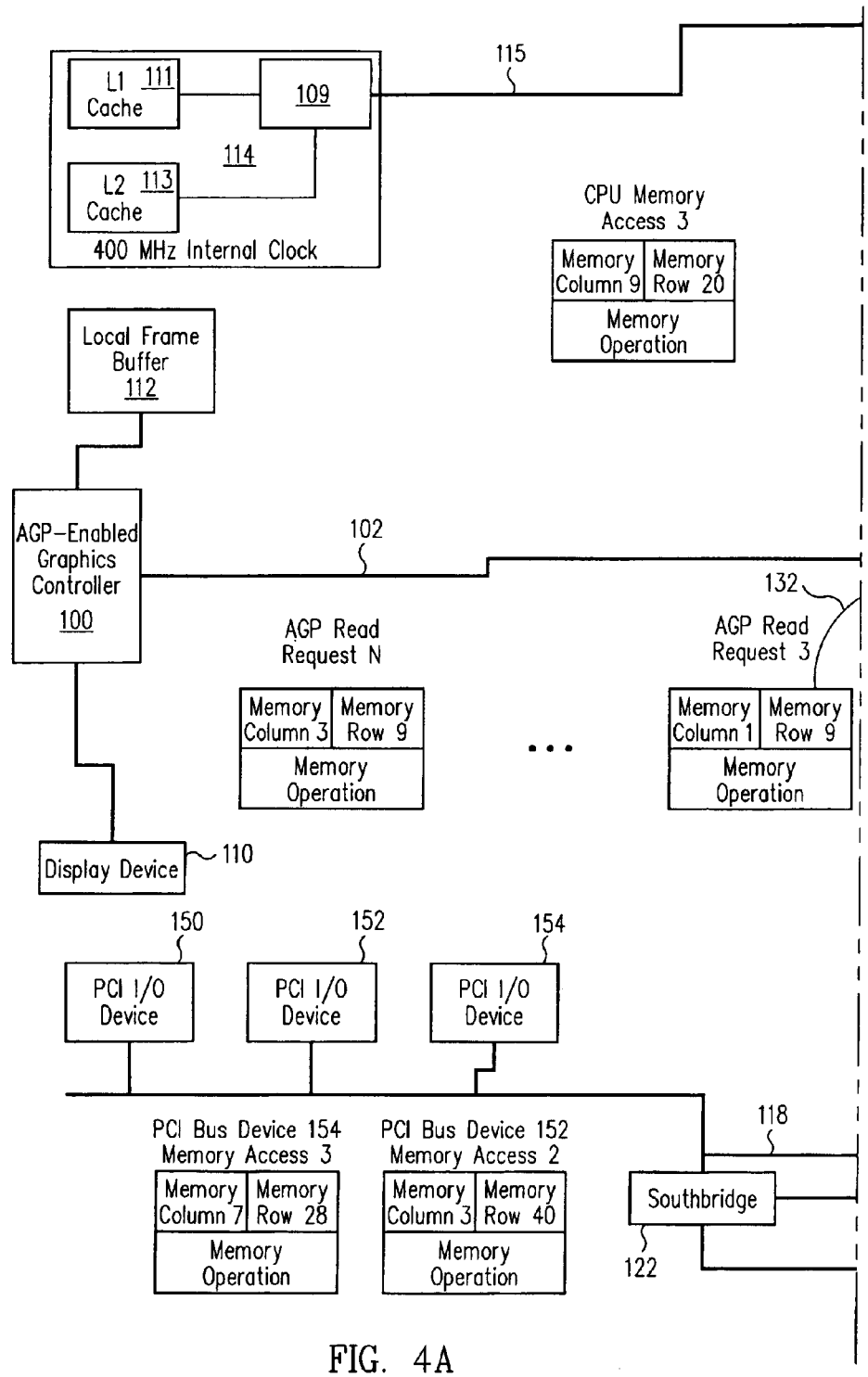
FIG. 4 (including 4A, 4B, and 4C) shows a high-level pictographic representation of a memory controller including a memory state tracking unit.
Figure 4B:
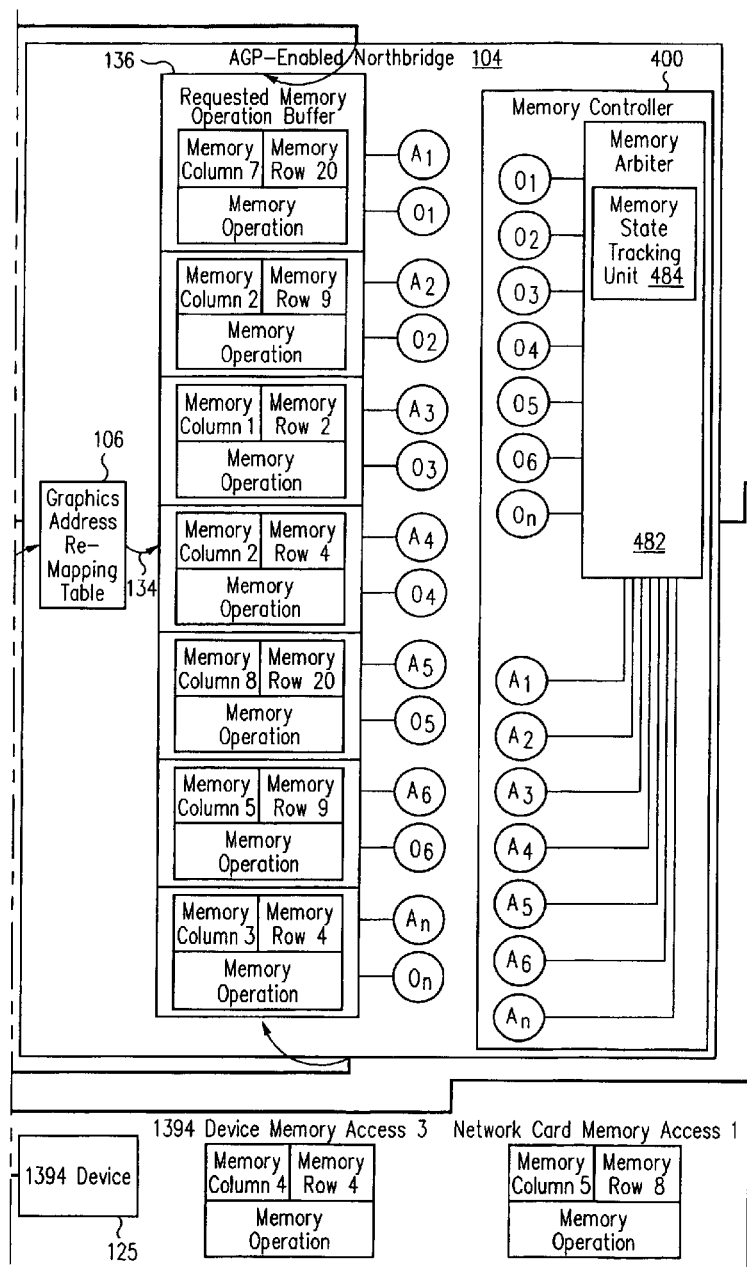
Figure 4C:
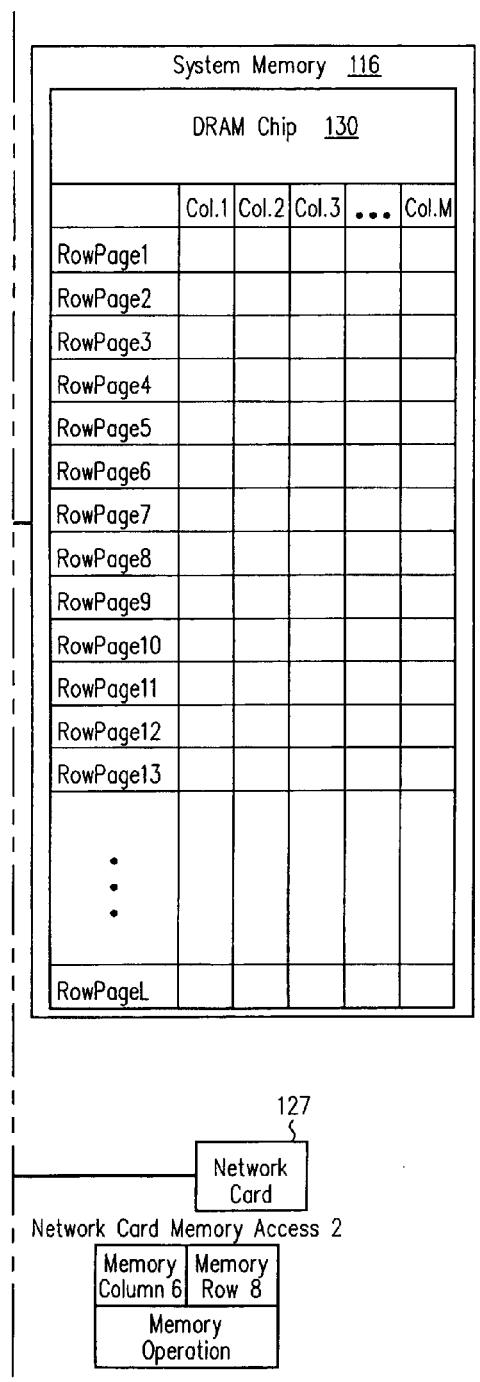
Figure 4C:
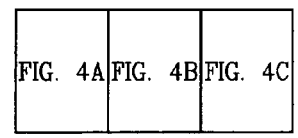

Referring now to FIG. 3, shown is a high-level block diagram illustrating in broad overview how the system 101 of FIG. 1, accesses memory and manipulates data within the memory locations specified by the memory access requests illustrated in FIG. 2. Shown are graphics controller 100, AGP interconnect 102 (a data bus), and Northbridge 104.

The remaining shown components function substantially similar to the like-numbered components described in relation to FIGS. 1 and 2.

As has been shown in relation to FIG. 2, in a typical data processing system multiple devices are often vying for access to system memory, a fact illustrated in FIG. 2 by the fact that various and different requests to access system memory are simultaneously present on CPU bus 115, AGP interconnect 102, and PCI bus 118. Those skilled in the art will recognize that there are a myriad of ways in which the various requests vying for system memory access can be serviced. For sake of illustration, FIG. 3 shows the requests being serviced in counter-clockwise "round-robin" fashion, starting with the requests on CPU bus 115. That is, FIG. 3 depicts CPU memory access 1 as the first requested memory operation loaded into requested memory operation buffer 136; thereafter, in accordance with a counter-clockwise round robin scheme, appear within requested memory operation buffer 136 AGP read request 1, PCI I/O device 150 request, 1394 device memory access 1, CPU memory access 2, AGP read request 2, and 1394 device memory access 2. The order in which the requests appear in requested memory operation buffer 136 is consistent with the round-robin scheme, with the understanding that 1394 device memory access 2 appears on PCI bus 118 before PCI bus device memory access 2, and thus that is why 1394 device memory access 2 is shown as loaded in requested memory operation buffer 136.

With the requested memory operations so loaded, memory controller 400 can thereafter service the requests in requested memory operation buffer 136 in the fashion dictated by the system. Various ways of servicing such requests are set forth below in the various following embodiments.

II. Page-State Sensitive Memory Access and Control

Although the following embodiments are described via the use of "page-state" terms, it is to be understood that the term "page-state" is exemplary. It will be understood by those within the art that as used herein the term "page-state" is a specific instance of a way in which the availability of memory storage can be tracked, and it is intended that such term be understood to equate to all substantially equivalent memory device storage state referents which are used to demarcate the state of various aspects of system memory, such as "bank state".

It has been discovered that the efficiency of memory controller 400 can be enhanced by empowering memory controller 400 such that memory controller 400 can reorder memory transactions to substantially maximize memory efficiency. This approach can, among other things, increase the page-hit rate, thus improving the memory subsystem performance. In one embodiment, memory controller 400 may reorder transactions such that accesses to currently open pages are completed ahead of transactions that are targeted to pages not currently open.

With reference now to FIG. 4, shown is a high level representation of a memory controller in accordance with one embodiment of the present invention. Associated with requested memory operation buffer 136 are memory address location lines $A_1$ through $A_n$. Further associated with requested memory operation buffer 136 are memory operation lines $O_1$ through $O_n$. (The letter "n" is utilized to indicate the upper limit of storage locations available in requested memory operation buffer 136, where such storage locations are envisioned to be numbered from 1 to n, where n is some positive integer.) Although requested memory operation buffer 136 is shown as separate from memory controller 400, it may in fact be a part of memory controller 400.

Memory arbiter 482, contained within memory controller 400, receives memory address location lines $A_1$ through $A_n$. That arrangement allows memory arbiter 482 to have knowledge of the memory locations to be accessed by substantially all currently pending memory operations present within requested memory operation buffer 136.

Further shown is that memory operation lines $O_1$ through $O_n$ are also accepted by memory arbiter 482. Memory operation lines $O_1$ through $O_n$ convey information related to whether a respective memory operation is either a read, or write, or other operation. Consequently, memory address location lines $A_1$ through $A_n$ respectively associated with, or paired, with respective memory operation lines $O_1$ through $O_n$ illustrate that memory arbiter 482 has knowledge of both the address to be accessed by specific pending memory operations contained within requested memory operation buffer 136 as well as the type of operation to be performed upon the data contained within the respective memory addresses to be accessed by the pending memory operation requests.

Depicted is that memory state tracking unit 484 maintains information about the state of system memory 116, such as information about the state of open pages. The memory arbiter 482 and/or components thereof (e.g. memory state tracking units 484) are operably connected to one or more memory devices (e.g., DRAM chip 130) by logical association whereby memory status is determined based on previous memory access activity (e.g., previous memory requests issued and/or elapsed time since requests issued can be used to determine/acquire the status of the one or more system memory devices). Such information may include, among other things, the identity of pages actually open within DRAM chip 130, the last accessed position within the open pages of DRAM chip 130, the direction in which the bus associated with DRAM chip 130 is pointed (i.e., whether the bus is pointed toward system memory 116 versus being pointed toward memory arbiter 482).

From the foregoing it can be seen that memory arbiter 482 can be aware, for example, of the open pages in system memory 116, the direction in which the bus associated with DRAM chip 130 is pointed, the addresses to be accessed by pending memory operations in requested memory operation buffer 136, and the types of operations to be performed by those pending memory operations present in requested memory operation buffer 136.

In one embodiment, memory arbiter 482 examines the information cited (e.g., addresses to be accessed by pending memory operations, the type of memory operation to be performed, the state of system memory 116 (specifically the pages open within DRAM chip 130 and the direction of the buses associated with those respective open pages)) to determine which pending memory operation(s) should be next executed.

In one embodiment, the pending memory operations are scheduled for execution in the following hierarchy: first, those non-speculative memory operations directed to open pages and of a type consistent with the direction of any data bus associated with those open pages (e.g., a write operation would be scheduled for execution if a bus were pointed from memory arbiter 482 to an open page in system memory 116 to which the write operation indicates data is to be written) are scheduled for execution (and, optionally, following the selection, thereafter reordered on the basis of the relative priorities of the requests selected for execution). Second scheduled for execution are those pending non-speculative memory operations within requested memory operation buffer 136 which are directed toward open pages, but which are of a type which would require that the bus associated with the open pages be reversed in direction (again such requests can be optionally rearranged following selection depending upon any associated priorities). Third scheduled for execution are those non-speculative operations directed toward pages which are not currently open in system memory, but which are consistent with the direction of a bus associated with the target pages (again, optional reordering may be done). Fourth scheduled are those non-speculative requests directed to closed pages and which are inconsistent with the direction of a bus associated with the target pages (again, optional reordering may be done). Fifth scheduled are those non-speculative operations directed to pages in a refresh state (again, optional reordering may be done). Last scheduled are speculative operations or accesses. Other embodiments for hierarchical reordering within the spirit of the foregoing also exist, such as reordering of the foregoing described scheme or a subset thereof, or the foregoing hierarchy analogously reengaged in for scheduling the speculative operations or accesses.

Those skilled in the art will recognize that the foregoing described scheme will reduce memory latency in that one of the largest factors associated with memory latency is that associated with closing a currently open page and opening a currently closed page. Furthermore, those skilled in the art will also recognize such memory latency can increase significantly if the page to be opened is a page currently in a "refresh" state. Thus, the embodiment shown should significantly decrease memory latency and increase the performance of data processing systems.

Figure 5A:
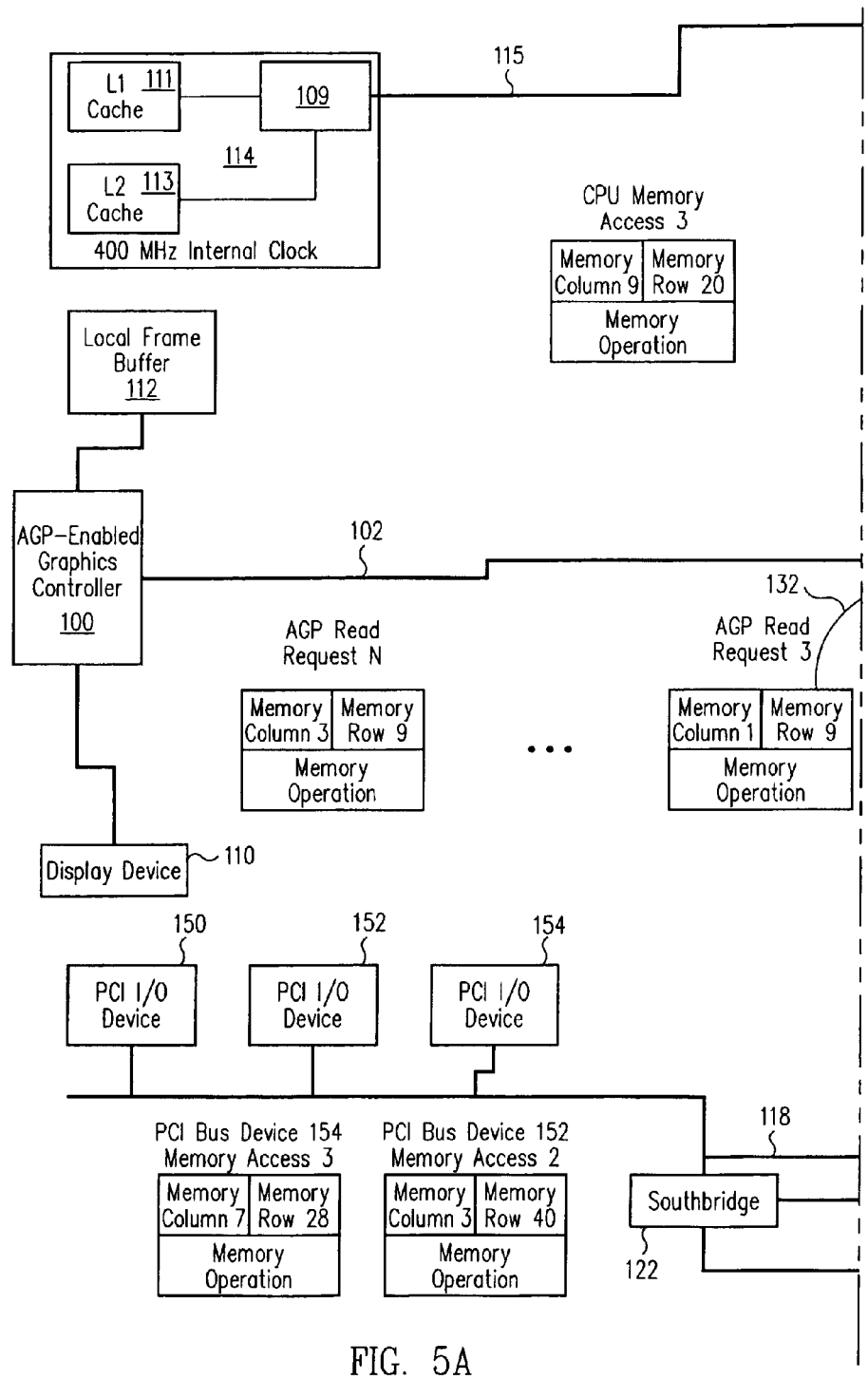
FIG. 5 (including 5A, 5B, and 5C) shows a high-level pictographic representation of a memory controller including a memory state tracking unit.
Figure 5B:
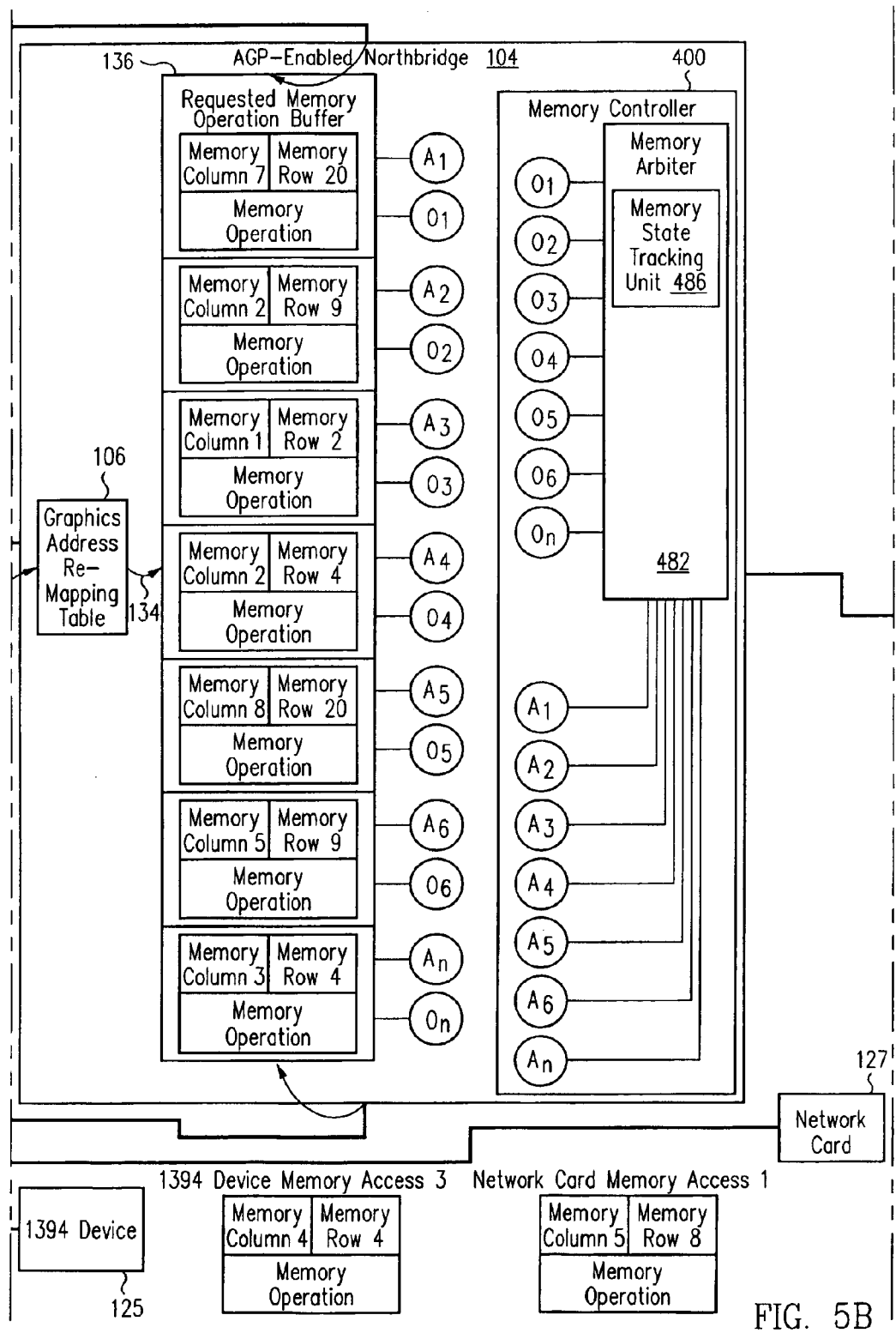
Figure 5C:
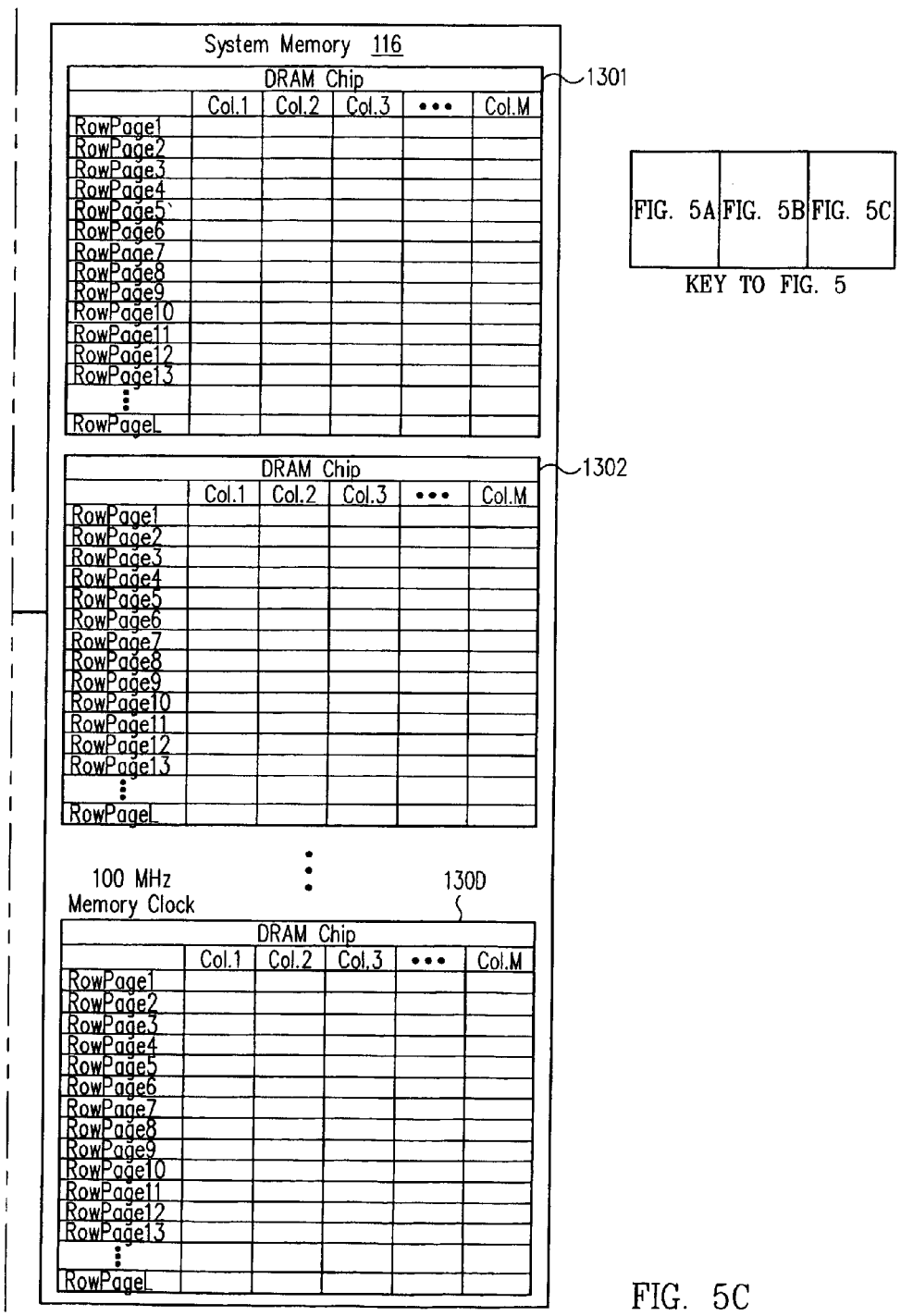
Figure 6A:
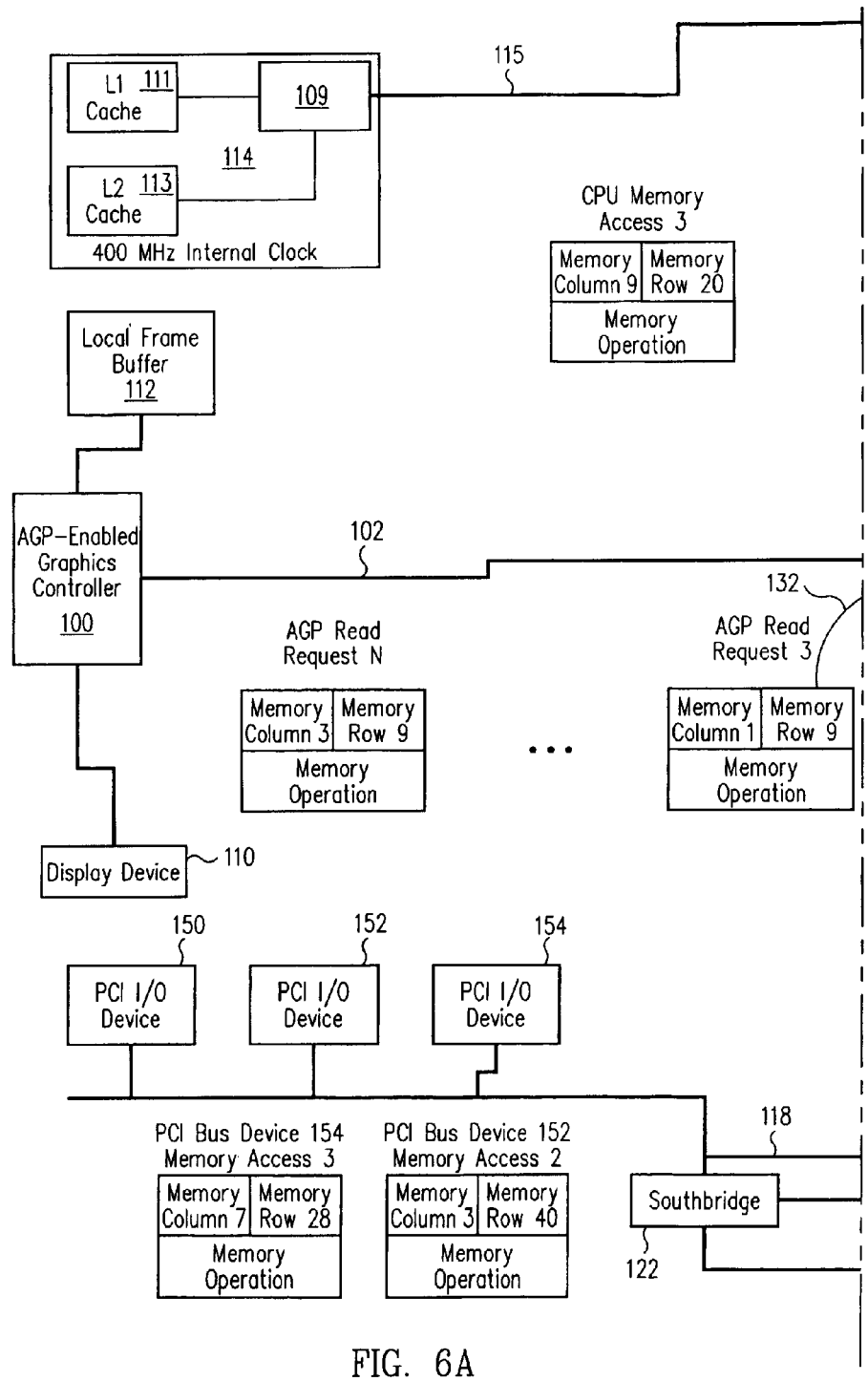
FIG. 6 (including 6A, 6B, and 6C) illustrates a high-level pictographic representation of a memory controller including memory state tracking units.
Figure 6B:
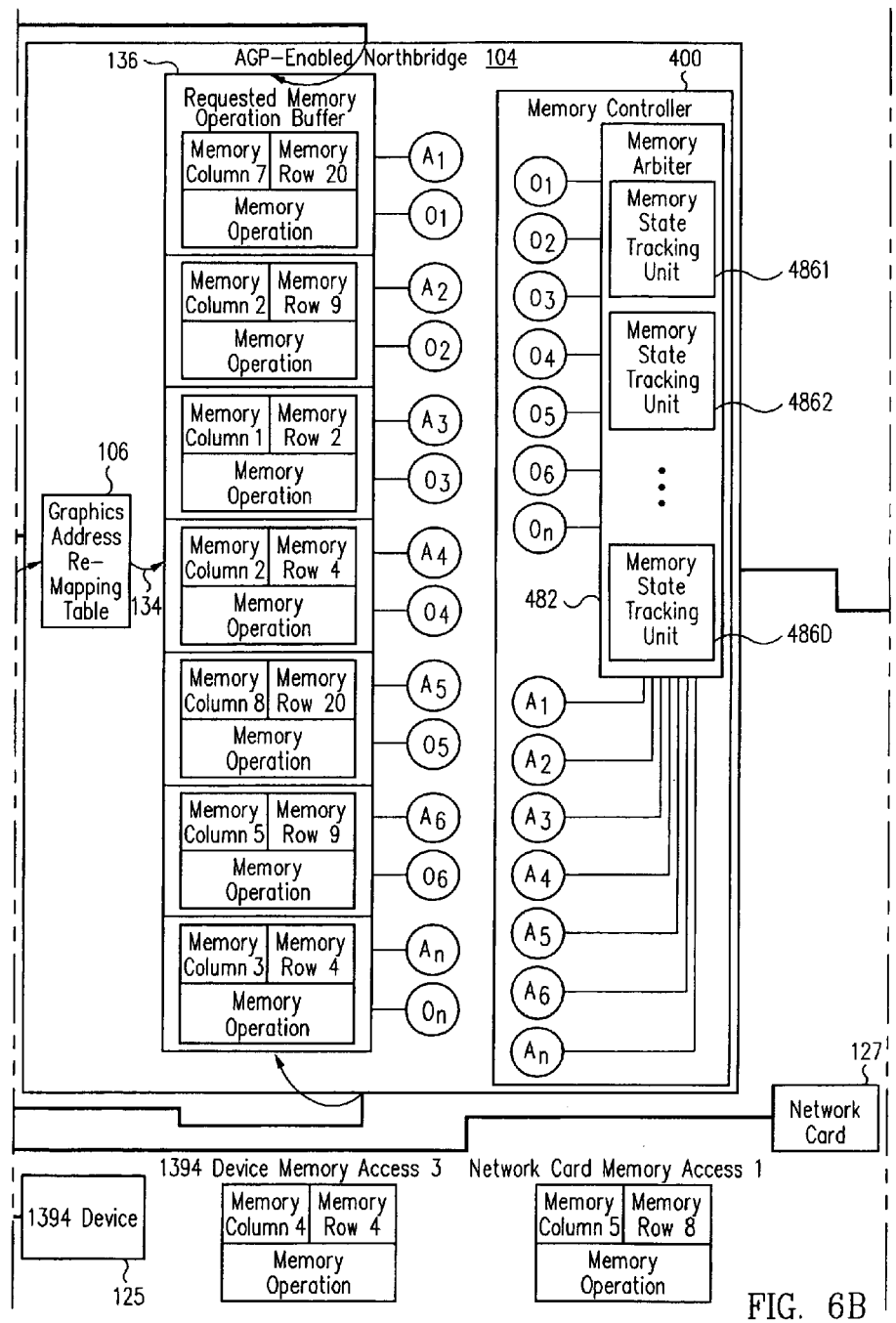
Figure 6C:
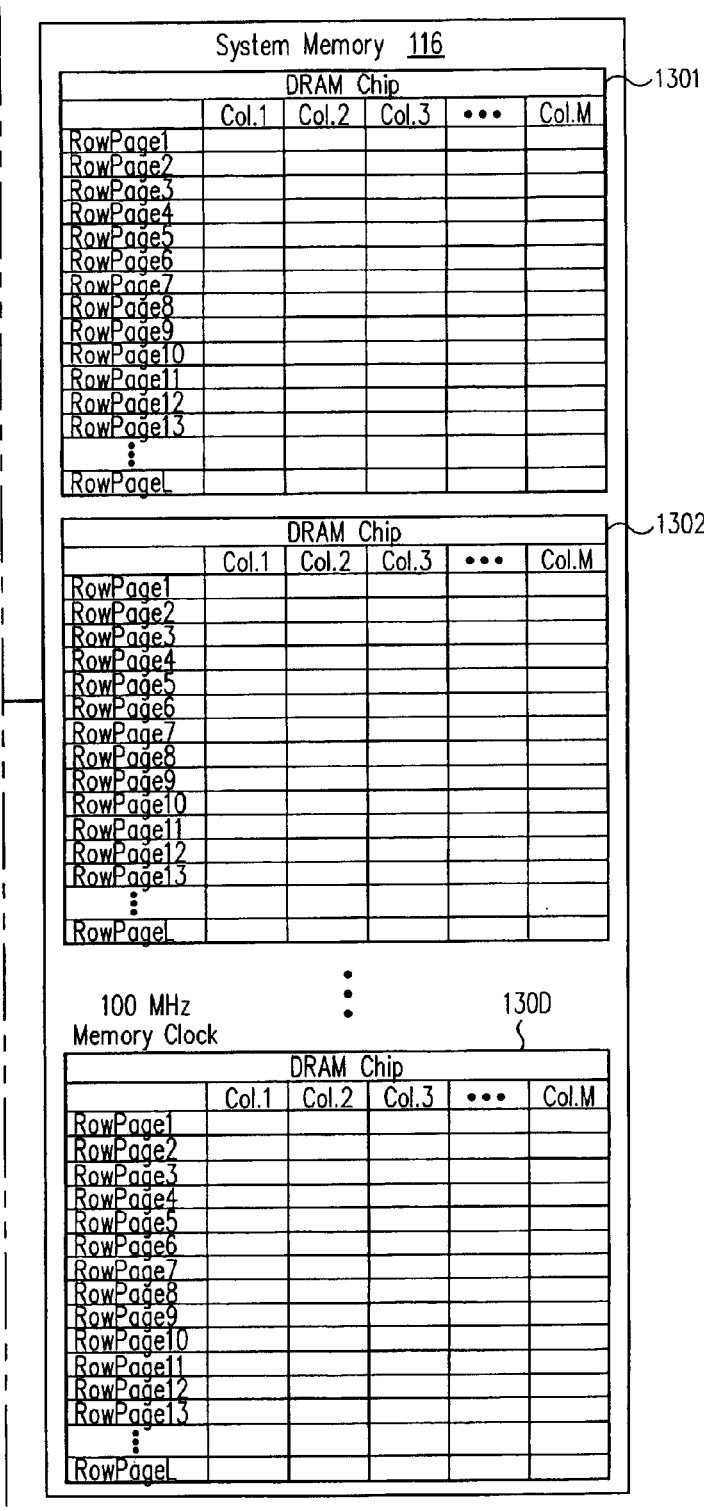
Figure 6C:
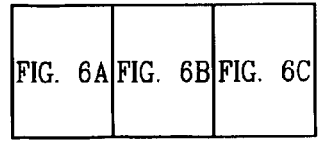

Referring now to FIG. 5, depicted is a high level representation of a memory controller that is substantially similar to that shown in FIG. 4. However, notice that system memory 116 is shown containing multiple DRAM chips 130$_1$–130D, rather than just one DRAM chip. Memory state tracking unit 486 maintains system memory 116 status. Memory arbiter 482 can then utilize the system memory 116 status information, in conjunction with the address and operation information of the pending memory operation transactions in requested memory operation buffer 136 in order to schedule pending memory operations for execution. The memory arbiter 482 and/or components thereof (e.g., memory state tracking unit 486) are operably connected to one or more memory devices (e.g., DRAM chips 130$_1$–130D) by logical association whereby memory status is determined based on previous memory access activity (e.g., previous memory requests issued and/or elapsed time since requests issued can be used to determine/acquire the status of the one or more system memory devices). That scheduling can be based upon a combination of the information available memory arbitrary 482. For example, the scheduling could be based upon the bus directions and their associated open pages of the multiple DRAM chips 130$_1$–130D in conjunction with the type of memory operations in requested memory operation 136 to be performed. Those skilled in the art will also recognize that the described embodiment could also have, in the place of DRAM chips 130$_1$–130D, banks of memory and that the principle operation in such an embodiment would be substantially the same as that described in relation to FIG. 5. In fact, in a typical memory system, there will be multiple DRAM chips, each having multiple banks.

With reference now to FIG. 6, the memory controller includes various elements shown in the embodiments of FIG. 4 and FIG. 5. Specifically, shown is that memory arbiter 482 has contained within it memory state tracking units 486$_1$–486D. Each memory state tracking unit 486$_1$–486D is respectively associated with a DRAM chip 130$_1$–130D in system memory 116 and maintains memory status information for its associated DRAM chip 130$_1$–130D. The memory arbiter 482 and/or components thereof (e.g., memory state tracking units 486$_1$–486D) are operably connected to one or more memory devices (e.g., DRAM chips 130$_1$–130D) by logical association whereby memory status is determined based on previous memory access activity (e.g., previous memory requests issued and/or elapsed time since requests issued can be used to determine/acquire the status of the one or more system memory devices).

Each memory state tracking unit 486$_1$–486D receives, independently of all other memory state tracking units 486$_1$–486D, the signals present on memory address lines $A_1$–$A_n$ and the information on memory operation lines $O_1$–$O_n$. Consequently, each memory state tracking unit 486$_1$–486D functions essentially autonomously from other memory state tracking units 486$_1$–486D in essentially the fashion described for memory state tracking unit 484 in FIG. 4. Not shown, but intended to be understood is that each memory state tracking unit 486$_1$–486D is intended to communicate with every other memory state tracking unit 486$_1$–486D such that the memory state tracking units 486$_1$–486D do not retrieve and duplicate memory operations pending in requested memory operation buffer 136 amongst themselves.

Figure 7:
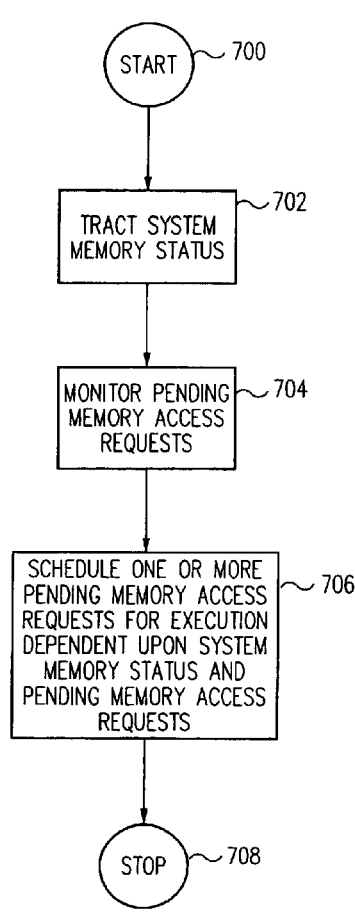
FIG. 7 depicts a high-level logic flowchart of operation of the memory controller.

Referring now to FIG. 7, depicted is a high-level logic flowchart of memory controller operation. Method step 700 illustrates the start of the process. Method step 702 shows the step of memory arbiter 482 tracking system memory 116 status. Method step 704 depicts the step of memory arbiter 482 monitoring pending memory access requests, such as those pending memory access requests depicted in requested memory operation buffer 136. Method step 706 illustrates the step of memory arbiter 482 scheduling one or more one or more pending memory access requests for execution dependent upon the system memory status and the pending memory access requests. Method step 708 depicts the end of the process.

Figure 8:
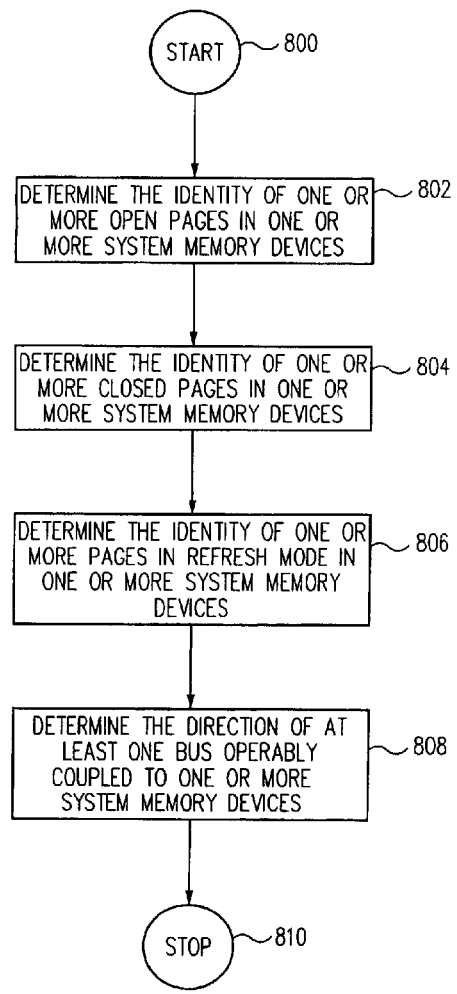
FIG. 8 illustrates a high-level logic flowchart depicting one embodiment of a process by which a memory arbiter monitors system memory status.

With reference now to FIG. 8, illustrated is a high-level logic flowchart depicting one embodiment of a process by which memory arbiter 482 monitors system memory status. Method step 800 shows the start of the process. Method step 802 depicts the step of memory arbiter 482 determining the identity of one or more open pages in one or more system memory devices, such as DRAM chips 130$_1$–130D or banks of system memory. Method step 804 illustrates the step of memory arbiter 482 determining the identity of one or more closed pages in one or more system memory devices, such as DRAM chips 130$_1$–130D or banks of system memory. Method step 806 depicts the step of memory arbiter 482 determining the identity of one or more pages in refresh mode in one or more system memory devices, such as DRAM chips 130$_1$–130D or banks of system memory. Method step 808 illustrates determining the direction the of at least one bus operably coupled to one or more system memory devices, such as DRAM chips 130$_1$–130D or banks of system memory. Method step 810 shows the end of the process.

Figure 9:
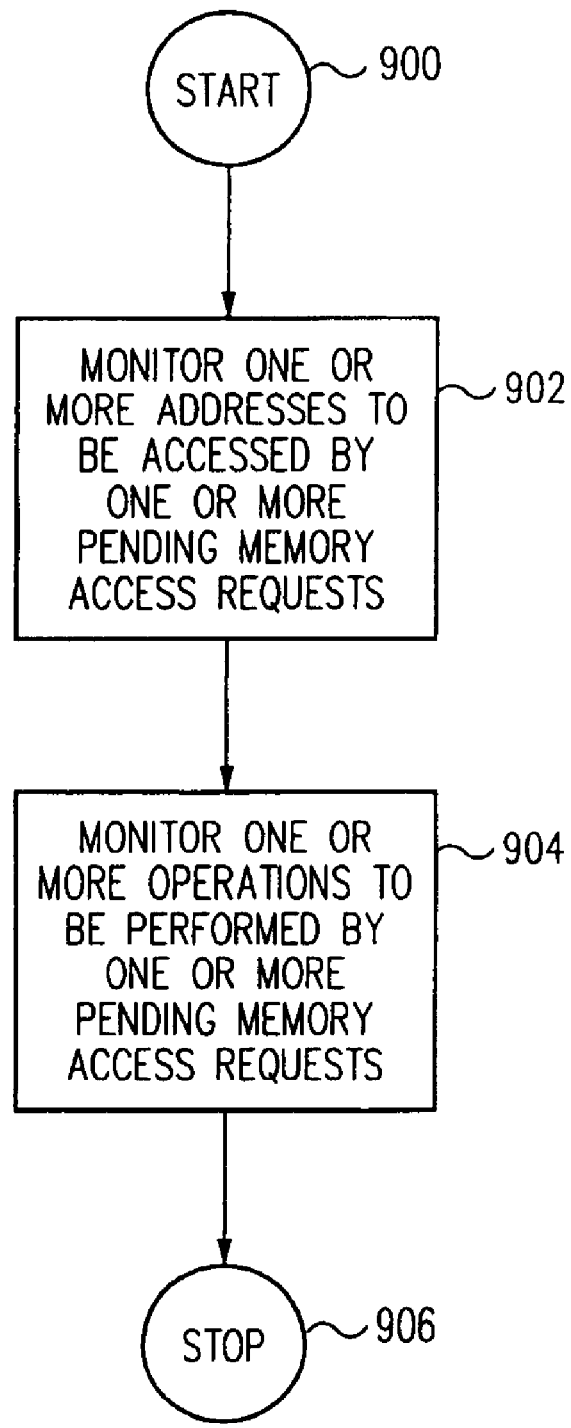
FIG. 9 shows a high-level logic flowchart depicting one embodiment of a process by which a memory arbiter monitors pending memory access requests.

Referring now to FIG. 9, shown is a high-level logic flowchart depicting one embodiment of a process by which memory arbiter 482 monitors pending memory access requests. Method step 900 shows the start of the process.

Method step 902 depicts the step of memory arbiter 482 monitoring one or more addresses to be accessed by one or more pending memory access requests, such as those shown in requested memory operation buffer 136. Method step 904 illustrates the step of memory arbiter 482 monitoring one or more operations to be performed by one or more pending memory access requests, such as those shown in requested memory operation buffer 136. Method step 906 shows the end of the process.

Figure 10:
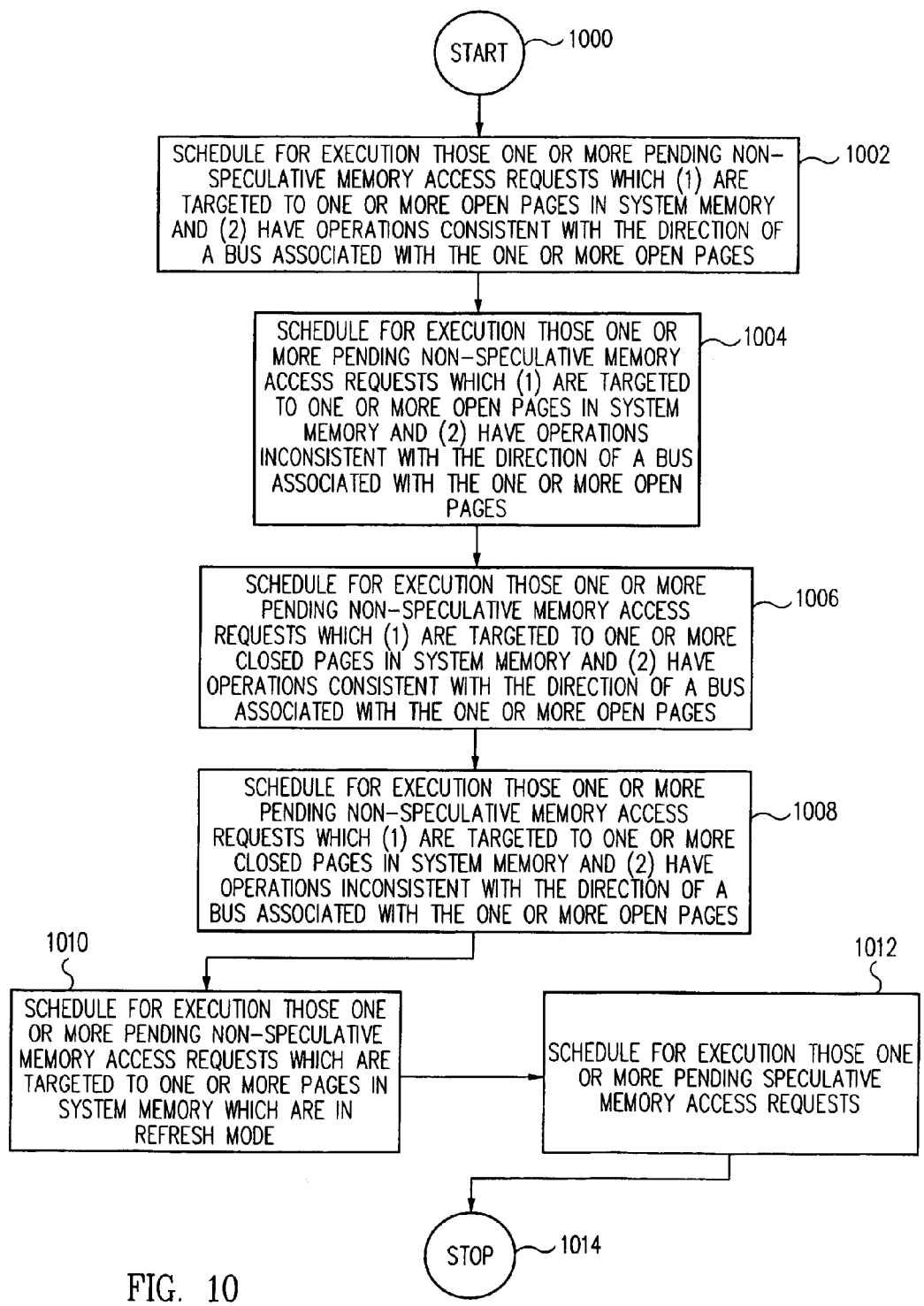
FIG. 10 shows a high-level logic flowchart depicting one embodiment of a process by which a memory arbiter schedules one or more pending memory access requests for execution, in a hierarchical fashion, in response to system memory status and pending memory access requests.

With reference now to FIG. 10, shown is a high-level logic flowchart depicting one embodiment of a process by which memory arbiter 482 schedules one or more pending non-speculative memory access requests for execution, in a hierarchical fashion, in response to system memory status and pending non-speculative memory access requests. Method step 1000 shows the start of the process. Method step 1002 depicts the step of memory arbiter 482 scheduling for execution those one or more pending non-speculative memory access requests which (1) are targeted to one or more open pages in system memory and (2) have operations consistent with the direction of a bus associated with the one or more open pages. Method step 1004 illustrates the step of memory arbiter 482 scheduling for execution those one or more pending non-speculative memory access requests which (1) are targeted to one or more open pages in system memory and (2) have operations inconsistent with the direction of a bus associated with the one or more open pages. Method step 1006 shows the step of memory arbiter 482 scheduling for execution those one or more pending non-speculative memory access requests which (1) are targeted to one or more closed pages in system memory and (2) have operations consistent with the direction of a bus associated with the one or more open pages. Method step 1008 depicts the step of memory arbiter 482 scheduling for execution those one or more pending non-speculative memory access requests which (1) are targeted to one or more closed pages in system memory and (2) have operations inconsistent with the direction of a bus associated with the one or more open pages. Method step 1010 illustrates the step of memory arbiter 482 scheduling for execution those one or more pending non-speculative memory access requests which are targeted to one or more pages in system memory which are in refresh mode. Method step 1012 shows the step of memory arbiter 482 scheduling for execution those one or more pending speculative memory access requests. Method step 1014 depicts the end of the process. Other embodiments for hierarchical reordering within the spirit of the foregoing described scheduling process also exist, such as reordering of the foregoing described process or a subset thereof, or the foregoing process analogously reengaged in for scheduling the speculative requests.

III. Structure and Operation for Power Reduction Modes in the Memory Controller

The foregoing has described various embodiments for tracking the state of a memory chips and memory banks by memory state tracking units 484, 486, 4861–486D and reordering memory operations by memory arbiter 482 according to the status information maintained by the memory state tracking units in order to minimize latency for memory access operations.

However, the various embodiment described above did not consider power utilization by system memory 116. Power consumption may be of concern in certain environments such as mobile operations. Accordingly, the memory controller described herein may also be utilized to schedule memory transactions, based on the status information obtained by memory state tracking units and on a desired power mode of operation, in a manner as to reduce the power consumption of the memory devices being controlled by the memory controller. In addition to operating more efficiently from a power perspective, the memory controller also reduces transaction latency, at least as compared to previous power savings approaches provided by memory devices and memory controllers.

As described earlier, advanced DRAM devices such as Rambus' DRDRAM devices are organized into banks, which are further divided into rows. Each row contains a large number of bits called a page. The page is further subdivided into columns. For example, a DRDRAM device might have eight sixteen bit words on a single page.

Each bank, and each page in a bank can be in one of several modes. Those modes affect both the latency for a transaction accessing a page and the power consumption of the memory device. In particular, for pages, there are two states of primary interest: open and closed. When a page is open, any of the columns may be accessed, thus reducing latency to access any portion of that page. However, keeping the page open causes device power usage to increase. When a page is closed, the columns can not be directly accessed without first opening the page and thus accesses to closed pages have increased transaction latency, but power consumption is less.

In order to take advantage of both power consumption considerations and latency considerations, the memory controller implements at least two different power modes. Depending on the mode that is currently in effect the memory controller will order transactions differently to implement the appropriate power policy.

In one embodiment, the memory controller provides a high speed and high power mode and a low speed and low power mode. The power mode(s) are programmable and may be set by appropriate system management software by writing the power mode control register 422 in Northbridge 104 (see FIG. 3). Note that while power mode control register 422 is shown as separate from memory controller 400, it may also be incorporated into memory controller 400. Further, for convenience in illustrating other aspects of memory controller 400, power mode control register 422 is not shown in FIGS. 4–6.

The high power mode of operations is illustrated in FIGS. 3–10 and associated description and operates to minimize latency of memory operations without regard to power considerations. When a low power mode is desired, any or all of the following policies may be implemented by the memory controller to provide lower power and still provide improved latency over traditional power savings approaches, which tend to rely on pages being closed:

(1) At the end of a current transaction, pages are immediately closed unless there are more transactions present in the memory controller.

(2) Transactions that target the same page are rescheduled to minimize the length of time that the page remains in the open state.

(3) When a page is opened for access, additional data is read speculatively while the page is open to reduce the need for reads.

(4) The memory controller uses the knowledge of page state (open or closed) and the bank state in scheduling memory transactions. Where possible, transactions that target active banks and pages are moved ahead of transactions that target inactive banks and closed pages.

(5) When the target page for a streaming transaction is closed and the streaming transaction can tolerate a large latency, such as may be the case for certain isochronous transactions, the request is held in the memory controller until a predetermined number of accesses to a page have accumulated. At that time the page shall be opened and the queued transactions shall be issued to the controller one after the other and then the page shall be closed and accumulation shall resume.

Figure 11A:
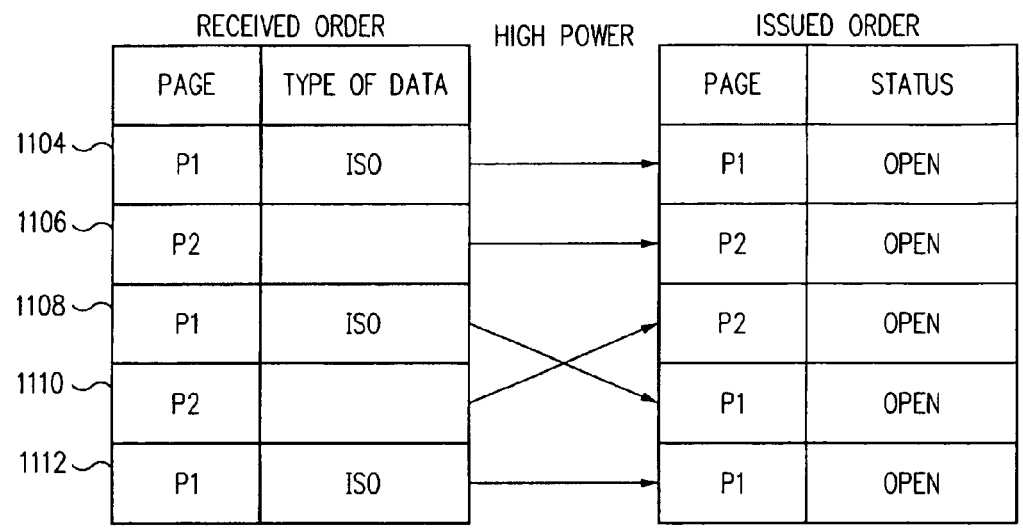
FIG. 11A illustrates reordering operations that may occur in one embodiment of the invention when the memory controller is selected for high power modes of operation.
Figure 11B:
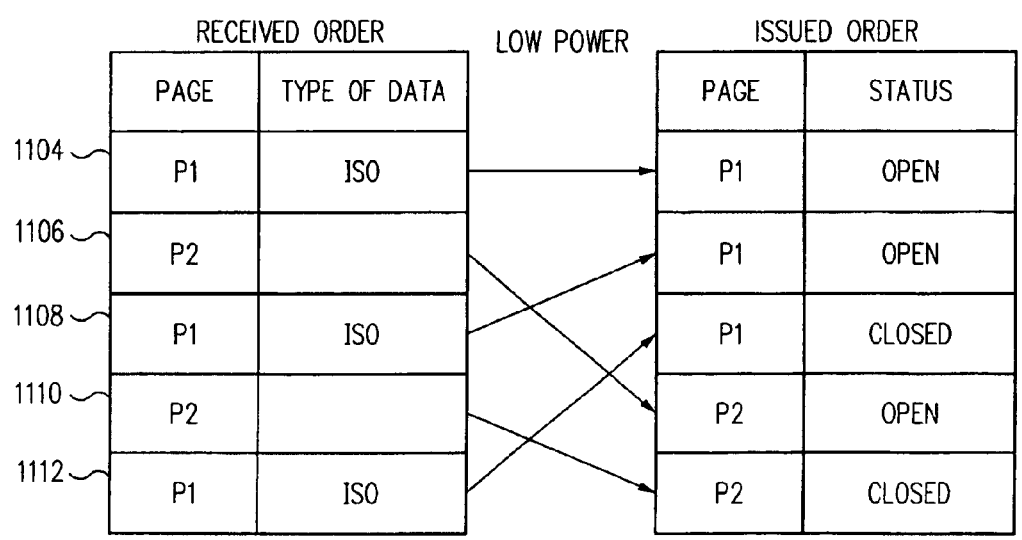
FIG. 11B illustrates reordering operations that may occur in one embodiment of the invention when the memory controller is selected for low power modes of operation.
Figure 11C:
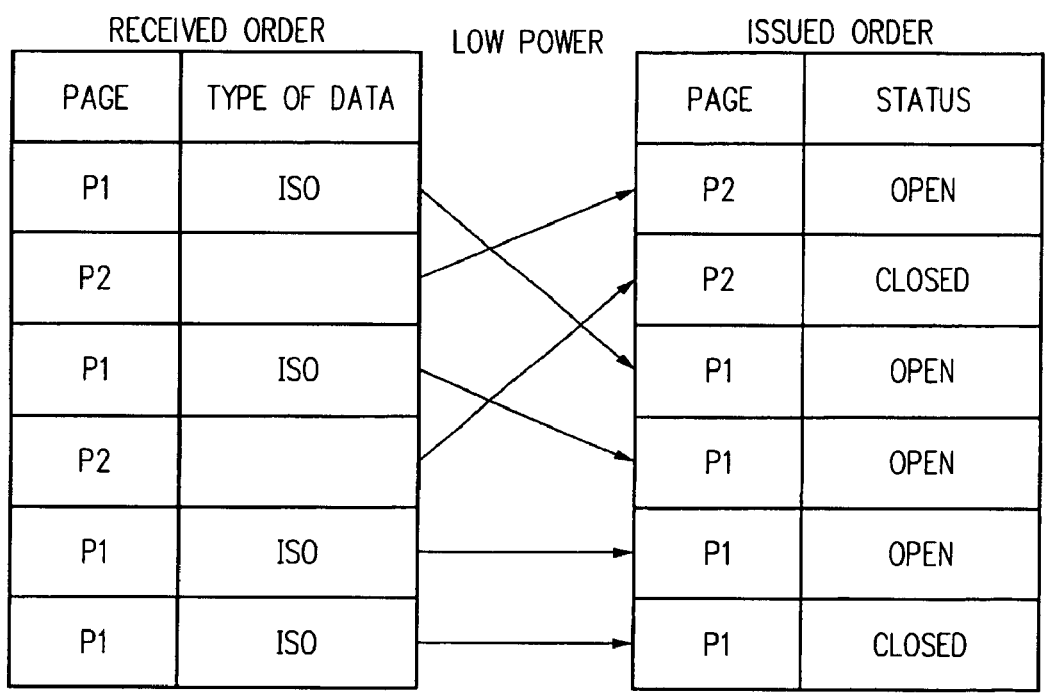
FIG. 11C illustrates another example of reordering operations that may occur in one embodiment of the invention when the memory controller is selected for low power modes of operation.

Referring to FIGS. 11A–11C, illustrated are differing approaches to ordering memory transactions according to whether the memory controller is operating in the high power or low power mode. In FIG. 11A, the received order for requested memory transactions is shown along with the order in which the memory transactions are issued to memory. In the example given, the transactions as received in, e.g., requested memory operation buffer 136 in the order given according to the round robin scheme described previously. In the high power mode, the first two requested transactions to pages P1 and P2 respectively, are issued to the memory in the order received. The next transaction to page P2 1110 is moved ahead of the next transaction to page P1 1108. Thus, as issued to memory, the transactions to page P2 are grouped together and the transactions to P1 are partially grouped together. Further, note that the pages are left open to allow for more efficient future accesses to those pages.

In contrast, referring to FIG. 11B, a low power mode of operation is shown. All the accesses to page P1 are grouped together and issued to memory before the two accesses to page P2. Further, pages P1 and P2 are closed after the accesses to save power. Alternative, reordering is also possible in the low power mode. For instance, the three accesses to page P1, since they are isochronous accesses and may have a relatively long latency tolerance, may be held in the memory controller until such time as a sufficient number of access requests to that page have arrived. That situation is illustrated in FIG. 11C, which shows the accesses to page P2 being issued to memory first and the accesses to P1 waiting until, in this example, four memory access requests of the isochronous stream are received in requested memory operation buffer 136.

Thus, as illustrated in FIGURES 11B and 11C, at the end of a current transaction, pages are immediately closed unless there are more transactions present in the memory controller. Further, transactions that target the same page are rescheduled to try and minimize the length of time that the page remains in the open state. Not shown in FIGS. 11B and 11C, but also possible is to speculatively read additional data while the page is open to reduce the need for reads. A detailed description of a memory controller providing for speculative read capability can be found in copending U.S. patent application entitled, "Method And System For Generating and Utilizing Speculative Memory Access Requests in Data Processing Systems", application Ser. No. 09/208, 569, naming Geoffrey S. S. Strongin and Qadeer A. Qureshi as inventors and filed Dec. 9, 1998, which application is incorporated herein by reference.

Finally, the memory controller can use the knowledge of page state (open or closed) and the bank power state in scheduling memory transactions. Where possible, transactions that target active banks and pages are moved ahead of transactions that target inactive banks and closed pages to minimize number of open multiple pages and minimizing the number of active multiple banks.

Figure 12:
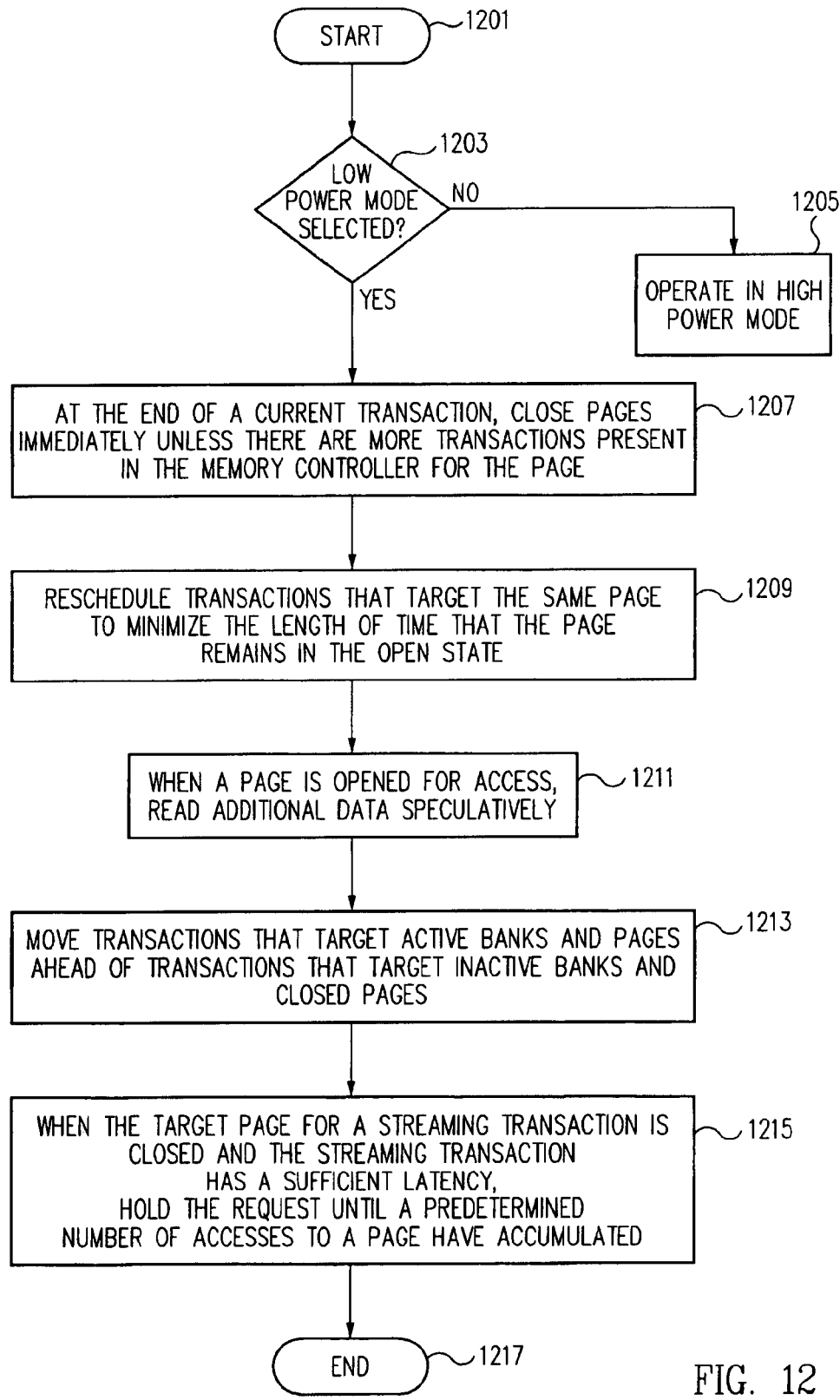
FIG. 12 illustrates a high level flow chart depicting one embodiment of a process for operating a memory controller in more than one power mode.

Referring to FIG. 12, the overall operation of the memory controller is illustrated according to one embodiment of the invention. The method of operations begins at 1201. At 1203, it is determined whether or not low power mode has been selected in low power mode register 422. If not, the memory controller operates in high power mode, such as those described in FIGS. 7–10. If low power mode has been selected, the memory controller operates in steps 1207 to close pages immediately at the end of a current transaction unless there are more transactions present in the memory controller for the page. In 1209, the memory controller reschedules transactions that target the same page to minimize the length of time that the page remains in the open state. In 1211, speculative reads may be provided. In 1213, transactions that target active banks and pages are moved ahead of those to closed banks and pages. Finally, in 1215, streaming transactions to closed pages are grouped provided that latency tolerances for the data stream at issue allows such grouping. The process ends in 1217.

As described in FIG. 12, a number of approaches for reducing power consumption are provided. Note that any combination of the illustrated techniques may be combined to form a memory controller that can operate in a low power mode. Note that the approach described herein uses very fine grain control over requested memory accesses to optimize both power usage and to reduce latency.

The foregoing detailed description has set forth various embodiments of the present invention via the use of block diagrams, pictographic representations, flowcharts and examples. It will be understood by those within the art that each component, step, and operation illustrated by the use of block diagrams, pictographic representations, and examples can be implemented, individually and/or collectively, by a wide range of hardware, software, firmware, or any combination thereof.

Other Embodiments

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

For example, while the foregoing described embodiments have been described in the context of a single processor for the sake of clarity, it will be understood by those within the art that the present invention could be used in multiple processor environments. Also, while the foregoing described embodiments have been described in the context of a single memory bus for the sake of clarity, it will be understood by those within the art that the present invention could be used in multiple memory bus environments. Accordingly, the described architectures are not intended to be limiting.

Also for example, while the embodiments have been described in the context of the AGP interface standard, it will be recognized that the embodiments herein can be applied to other similar problems which exist in other non-AGP interface standard systems wherein similar problems analogous to those solved by the present invention exist. For example, data processing systems wherein the AGP interface standard is not utilized, such as standard PCI and ISA systems. Thus, the specific protocols described are not intended to be limiting.

The foregoing described embodiments wherein the different components are contained within different other components (e.g., the memory state tracking units contained within the memory arbiters). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures. Likewise, any two components so associated can also be viewed as being "operably connected", or "operably coupled", to each other to achieve the desired functionality.

It is to be understood that although in the foregoing described embodiments the address and operations pending within requested memory operation buffer are shown separately, such could also be conveyed within the same signal and that such signals need not be separate. It will be understood by those within the art that such signals were shown separately such that the clarity and presentation of the invention could be preserved.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles.

What is claimed is:

1. A method of operating a memory controller comprising:
    reordering a plurality of memory access requests according to a selected power mode in a power mode sensitive reordering device;
    selecting as the selected power mode one of a high and low power modes;
    providing an indication of the selected mode to the power mode sensitive reordering device; and
    in the low power mode, reordering memory transactions to a first page from an original order to a new order, the new order having memory transactions grouped with other transactions to the first page to minimize the length of time that the first page remains in the open state.

2. The method as recited in claim 1 wherein in the high power mode, memory transactions are reordered to minimize latency.

3. A method of operating a memory controller comprising:
    reordering a plurality of memory access requests according to a selected power mode in a power mode sensitive reordering device;
    selecting as the selected power mode one of a high and low power modes;
    providing an indication of the selected mode to the power mode sensitive reordering device; and
    in the low power mode, reordering a memory access request requesting access to an open page, to provide to the memory a group of memory access requests to the open page before a memory access request to a closed page, received earlier by the memory controller, is provided to memory.

4. A method of operating a memory controller comprising:
    reordering a plurality of memory access requests according to a selected power mode in a power mode sensitive reordering device;
    selecting as the selected power mode one of a high and low power modes;
    providing an indication of the selected mode to the power mode sensitive reordering device; and
    in the low power mode, reordering a first memory access request requesting access to an open page which was received after a second memory access request to a closed page, to provide to the memory the first memory access request before the second memory access request to the closed page is provided to memory.

5. The method as recited in claim 4 further comprising, in the low power mode, holding a memory request for a closed target page until a predetermined number of memory requests for the closed target page have accumulated.

6. A memory controller for controlling memory devices comprising:
    a power mode sensitive reordering device coupled to receive a power mode indication wherein the memory controller includes a selectable high and low power mode, an indication of a selected one of the high and low power modes being coupled to the power mode sensitive reordering device as the power mode indication, and wherein the power mode sensitive reordering device reorders memory transactions according to the selected one of the high and low power modes.

7. The memory controller as recited in claim 6 wherein in the low power mode, the power mode sensitive reordering device reorders memory transactions to a first page in memory from an original order to a new order in which transactions to the first page are grouped together, to minimize the length of time that the first page remains in an open state.

8. The memory controller as recited in claim 6 wherein in the high power mode, memory transactions are reordered to minimize latency and wherein in the low power mode, memory transactions are reordered to minimize power consumption in the memory devices.

9. The memory controller as recited in claim 6 wherein in the low power mode, when a target page for a streaming transaction is closed, a memory request for the target page is held in the memory controller until a predetermined number of memory requests for the target page have accumulated.

10. The memory controller as recited in claim 6 wherein in the high power mode, memory transactions are reordered to minimize latency.

11. The memory controller as recited in claim 6 wherein in the low power mode, memory transactions are reordered to minimize power consumption in memory devices controlled by the memory controller.

12. A memory controller for controlling memory devices comprising a power mode sensitive reordering device coupled to receive a power mode indication wherein the memory controller includes a selectable high and low power mode, an indication of a selected one of the high and low power modes being coupled to the power mode sensitive reordering device as the power mode indication and wherein in the low power mode, the power mode sensitive reordering device reorders memory transactions to an open page from an original order to a new order which schedules together transactions to the open page before transactions to a closed page.

13. The memory controller as recited in claim 12 wherein in the low power mode, a memory access request to an open page is reordered from an original order to schedule together memory requests to the open page ahead of memory requests to a closed page.

14. An apparatus comprising:
a memory controller having a power mode sensitive memory reordering device;
wherein the memory controller includes a plurality of selectable power modes, and wherein an indication of a selected one of the power modes is coupled to the power mode sensitive reordering device; and wherein the power mode sensitive memory reordering device reorders memory transactions according to the selected one of the power modes; and wherein the memory controller further includes one or more memory state tracking units maintaining status information on a state of at least one memory device controlled by the memory controller, the status information being used in reordering of the memory transactions.

15. The apparatus as recited in claim 14 further comprising a processor coupled to the memory controller.

16. The apparatus as recited in claim 14 further comprising memory devices coupled to and controlled by the memory controller.

17. An apparatus comprising:
first means for receiving and storing memory transaction requests to at least one memory device;
second means coupled to the first means, for reordering the memory transaction requests according to a selected power mode, the power mode being selectable to be one of a high power mode and a low power mode; and
wherein in the high power mode, memory transactions are reordered to minimize latency and wherein in the low power mode, memory transactions are reordered to minimize power consumption in the at least one memory device.

18. An apparatus for controlling one or more memory devices comprising:
a requested memory operation storage coupled to receive and store requests for memory transactions to the one or more memory devices;
a power mode sensitive reordering circuit responsive to reorder the requests for memory transactions according to a selected one of at least a high and low power mode; and
wherein in the high power mode, the requests for memory transactions are reordered to minimize latency and wherein in the low power mode, the requests for memory transactions are reordered to minimize power consumption in the memory devices.

* * * * *